(12) United States Patent
Yamaguchi

(10) Patent No.: US 6,602,139 B2
(45) Date of Patent: Aug. 5, 2003

(54) PROGRAM EXECUTION SYSTEM, PROGRAM EXECUTION DEVICE, RECORDING MEDIUM, PROGRAM USED IN THE PROGRAM EXECUTION DEVICE, METHOD FOR SWITCHING VIEWPOINT ON DISPLAY DEVICE AND A METHOD FOR SWITCHING AIM ON DISPLAY DEVICE OF THE SYSTEM

(75) Inventor: Mari Yamaguchi, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/896,833

(22) Filed: Jun. 29, 2001

(65) Prior Publication Data
US 2002/0054018 A1 May 9, 2002

(30) Foreign Application Priority Data

Jul. 3, 2000 (JP) ........................................ 2000-201350
Jun. 26, 2001 (JP) ........................................ 2001-192780

(51) Int. Cl.⁷ ................................................ A63F 13/00
(52) U.S. Cl. .............................. 463/30; 463/31; 463/32; 463/37
(58) Field of Search .............................. 463/30, 31, 32, 463/33, 34, 36, 37, 38; 345/619

(56) References Cited

U.S. PATENT DOCUMENTS

| 5,624,117 | A | * | 4/1997 | Ohkubo et al. | ......... | 273/148 B |
| 6,146,277 | A | * | 11/2000 | Ikeda | .......................... | 463/43 |
| 6,165,073 | A | * | 12/2000 | Miyamoto et al. | ............. | 463/32 |
| 6,217,444 | B1 | * | 4/2001 | Kataoka et al. | ................. | 463/3 |
| 6,220,962 | B1 | * | 4/2001 | Miyamoto et al. | ............. | 463/32 |
| 6,280,323 | B1 | * | 8/2001 | Yamazaki et al. | .............. | 463/4 |
| 6,392,613 | B1 | * | 5/2002 | Goto | ............................ | 345/30 |
| 6,394,906 | B1 | * | 5/2002 | Ogata | ........................... | 463/38 |
| 6,419,582 | B1 | * | 7/2002 | Goden et al. | .................. | 463/33 |
| 6,425,822 | B1 | * | 7/2002 | Hayashida et al. | ............. | 463/7 |
| 2001/0023202 | A1 | * | 9/2001 | Okubo | ......................... | 463/35 |
| 2002/0082078 | A1 | * | 6/2002 | Togo et al. | .................... | 463/30 |
| 2002/0098886 | A1 | * | 7/2002 | Nishizawa et al. | ........... | 463/35 |
| 2002/0103031 | A1 | * | 8/2002 | Neveu et al. | .................. | 463/49 |
| 2002/0128070 | A1 | * | 9/2002 | Miyamoto et al. | ............. | 463/43 |

FOREIGN PATENT DOCUMENTS

JP   61-077924   4/1986
JP   3040155     5/1997

* cited by examiner

Primary Examiner—David A. Scherbel
Assistant Examiner—Frederick C. Nicolas
(74) Attorney, Agent, or Firm—Katten Muchin Zavis Rosenman

(57) ABSTRACT

In order to sensually grasp, during operation, the direction in which one is trying to switch the viewpoint and/or aim on a display device, even if the purpose is, for example, to knock down an opponent, a program execution device includes an aim/viewpoint selection means or function, which judges whether the operation input from the user is a viewpoint switching instruction or an aim switching instruction, a viewpoint switching processing means or function, which performs viewpoint switching processing if the result of the judgment in the aim/viewpoint selection means is that it is a viewpoint switching instruction, and an aim switching processing means, to perform aim switching processing if the result of the judgment in the aim/viewpoint selection means is that it is an aim switching instruction. An image display processing means of the program execution device is used to output to a monitor image data, drawn to an image memory (RAM) after having gone through processing by the viewpoint switching processing means or the aim switching processing means, and to display the image data on a screen of the monitor.

42 Claims, 18 Drawing Sheets

PROGRAM EXECUTION SYSTEM, PROGRAM EXECUTION DEVICE, RECORDING MEDIUM, PROGRAM USED IN THE PROGRAM EXECUTION DEVICE, METHOD FOR SWITCHING VIEWPOINT ON DISPLAY DEVICE AND A METHOD FOR SWITCHING AIM ON DISPLAY DEVICE OF THE SYSTEM

FIELD OF THE INVENTION

This invention relates to a program execution system that has at least one operation device connected to a program execution device that executes programs and inputs operation requests from the user into the program execution device, the program execution device, a recording medium on which are recorded programs and data to be used by the program execution system, the program itself, and a method for switching viewpoint and a method for switching aim on a display device of the program.

BACKGROUND OF THE INVENTION

As information devices such as program execution systems that include video game machines, there are entertainment systems that allow one to play games while manipulating operation devices while the system displays on the screen of a television receiver the content of the game, which is stored on a recording medium such as a CD-ROM.

The program execution device and operation device of such an entertainment system is usually connected by a serial interface, and when a clock signal is sent from the program execution device, key switch information, etc. that corresponds to user operations is sent synchronized to the clock signal.

Recently, systems have been developed and made practical in which operation devices have been equipped with built-in vibration generation means to provide vibration to the user upon request from outside (for example, from the program execution device), so as to give the user various types of vibration in response to user operations, for example during the course of playing a game.

If, for example, one changes the viewpoint or moves a virtual aim on display, using an operation device, usually this is done by manipulating direction keys called plus-sign keys; with these plus-sign keys, the operation of going in a direction determined by the key, such as leftward or upward, is simple, but the operation tends to become difficult for intermediate directions such as diagonally upward to the left or diagonally downward to the right.

Moreover, because the angle cannot be freely modified with a direction such as diagonally upward or downward to the left or somewhat leftward, one is forced to change the viewpoint in a simple direction, which creates the problem that in, for example, a shooting game or adventure game, the game proceeds in simple, boring ways.

SUMMARY OF THE INVENTION

It is an object of this invention to provide a program execution system, a program execution device, a recording medium, a program itself, and a method for switching viewpoint and a method for switching aim on the display of the program execution device, that make it possible to sensually ascertain the direction in which one wishes to switch a viewpoint and/or aim when manipulating an operation device, and to enjoy game development that one does not grow tired of.

This and other objects are attained by a program execution system comprising a program execution device that executes programs, at least one operation device that inputs operation requests by the user as operation instructions to the program execution device, and a display device that displays images output from the program execution device, a discrimination means that distinguishes the switching direction of the viewpoint in the display device based on a combination of output information output from the operation device in accordance with operation instructions from the user to first and second leftward instruction buttons and first and second rightward instruction buttons provided on said operation device, and a display switching means that switches said viewpoint to the switching direction distinguished by the discrimination means.

The program execution device of this invention, to which can be connected at least an operation device that outputs operation requests by a user as operation instructions and a display device for displaying images, comprises a discrimination means that distinguishes the switching direction of the viewpoint in the display device based on a combination of output information output from the operation device in accordance with operation instructions from the user to first and second leftward instruction buttons and first and second rightward instruction buttons provided on the operation device, and a display switching means that switches said viewpoint to the switching direction distinguished by the discrimination means.

On a recording medium of this invention are recorded a program and data used by a program execution system that includes a program execution device that executes programs, at least one operation device that inputs operation requests by the user as operation instructions to the program execution device, and a display device that displays images output from the program execution device. The program comprises a discrimination step that distinguishes the switching direction of the viewpoint in the display device based on a combination of output information output from the operation device in accordance with operation instructions from the user to first and second leftward instruction buttons and first and second rightward instruction buttons provided on the operation device, and a display switching step that switches said viewpoint to the switching direction distinguished by the discrimination step.

The program of this invention may be used in an entertainment system that has a program execution device that executes programs, at least one operation device that inputs operation requests by the user as operation instructions to said program execution device, and a display device that displays images output from said program execution device. The program comprises a discrimination step that distinguishes the switching direction of the viewpoint in the display device based on a combination of output information output from the operation device in accordance with operation instructions from the user to first and second leftward instruction buttons and first and second rightward instruction buttons provided on the operation device, and a display switching step that switches the viewpoint on the display device to the switching direction distinguished by the discrimination step.

In this way, when, for example, one wishes to switch the viewpoint to the left, it is done by using the two of the four buttons that are arranged on the left side for horizontal instructions. The switching direction to which the viewpoint in the display device is to be switched is distinguished by means of the discrimination means based on a combination of output information outputted from the operation device in accordance with operation instructions from the user, then the viewpoint is switched to the distinguished switching direction by means of the display switching means.

In this case, it suffices if the output information is data that includes the ON/OFF component of said buttons and to which the direction components that correspond to the buttons are allocated, and the discrimination means is provided with a switching direction discrimination means that distinguishes the switching direction according to a combination of these components.

Using the plus-sign keys, if the viewpoint is to be switched, say, leftward, it is done by manipulating the leftward key, but if the viewpoint is to be switched diagonally upward to the left or diagonally downward to the left, it is necessary to operate the upward key or downward key simultaneously with the leftward key. That is, it is necessary to operate keys that are not directly related to the leftward direction, and for a player who operates the operation device for the first time or a player who plays a video game for the first time, it is impossible to grasp sensually the direction to which one is trying to switch the viewpoint.

In the present invention, if one wishes to switch the viewpoint to, say, the left, it suffices to simultaneously operate the two buttons for horizontal direction indication that are arranged on the left side. By operating one or the other of said two buttons, the viewpoint is switched diagonally upward to the left or diagonally downward to the left.

If, for example, one wishes to switch the viewpoint upward, it suffices to simultaneously operate the two buttons for vertical direction indication that are arranged on the upper side. In this case too, the viewpoint is switched diagonally upward to the left or diagonally upward to the right by operating one or the other of said two buttons.

Thus, in the present invention, to switch the viewpoint leftward, it suffices to operate the buttons that are lined up on the left side of the operation device, and to switch the viewpoint upward, it suffices to operate the buttons that are lined up on the upper side; one can sensually grasp the direction in which to try to switch the viewpoint, even one who operates the operation device for the first time or one who plays a video game for the first time can switch the viewpoint simply and easily, and if it is applied to a video game; etc., one can enjoy game development that one does not grow tired of.

It suffices if the output information is data that includes size components that correspond to the force with which said user presses said buttons and to which the direction components that correspond to said buttons are allocated, and the discrimination means is made so as to have a switching direction computation means that computes the switching direction by vector computation based on the direction components and the size components. In this way, when one considers a case in which, for example, the viewpoint is to be switched leftward, the angle of diagonally upward to the left or diagonally downward to the left can be freely set by the size components. In other words, the viewpoint switching direction can be freely set, and smooth viewpoint switching can be realized.

Also, it suffices if the discrimination means is provided with a movement speed computation means that determines the movement speed of said viewpoint based on said size components. It is usual to switch the viewpoint at a fixed speed, but in cases in which one wants to switch the viewpoint speedily, as would be done in a shooting game or adventure game, a dilemma arises, and there is the fear of giving the user an impression of poor operability.

But because the viewpoint can be switched rapidly by changing the movement speed of said viewpoint based on the size components, the user can be given the awareness of good operability even in a shooting game or adventure game as referred to above, thus contributing to the popularization of video games, etc.

The above-mentioned buttons may be provided on the front part of the operation device. In this case, it suffices to arrange the buttons on the front part of said operation device in positions on the left and right that can be pressed by the fingers of the left and right hands of the user, to allocate left and right direction components that correspond to the left and right arrangement positions of the buttons as the output information that corresponds to the buttons, and to determine said switching direction based on these left and right direction components.

Also, it suffices to arrange those buttons on the front part of the operation device, aligned two each on the top and bottom, in positions on the left and right that can be pressed by the fingers of the left and right hands of the user, to allocate up, down, left, and right direction components that correspond to the up, down, left, and right arrangement positions of the buttons as said output information that corresponds to the buttons, and to determine the switching direction based on these up, down, left, and right direction components.

In this way, the switching direction of the viewpoint on the screen of the display device and the positions of the buttons to be operated will correspond to each other, one can be intuitively aware of which direction the viewpoint is being switched to, one can simply recognize the switching direction of the viewpoint, and even in a video game such as, for example, flight simulation in which it is difficult to be aware of a sense of direction, one can simply enjoy it, thus leading to the popularization of video games.

The program execution system of this invention may comprise a program execution device that executes programs, at least one operation device that inputs operation requests by the user as operation instructions to the program execution device, and a display device that displays images output from the program execution device, a discrimination means that distinguishes the switching direction of the virtual aim in the display device based on a combination of output information output from said operation device in accordance with operation instructions from the user to first and second leftward instruction buttons and first and second rightward instruction buttons provided on the operation device, and a display switching means that switches the virtual aim to the switching direction distinguished by the discrimination means.

The program execution device of this invention may be connected to at least an operation device that outputs operation requests by a user as operation instructions and a display device for displaying images, and the program execution device includes a discrimination means that distinguishes the switching direction of the virtual aim in the display device based on a combination of output information output from the operation device in accordance with operation instructions from the user to first and second leftward instruction buttons and first and second rightward instruction buttons provided on the operation device, and a display switching means that switches said virtual aim to the switching direction distinguished by the discrimination means.

The recording medium of this invention, on which are recorded a program and data used by a program execution system that includes a program execution device that executes programs, at least one operation device that inputs operation requests by the user as operation instructions to said program execution device, and a display device that displays images output from said program execution device, the program comprising a discrimination step that distinguishes the switching direction of the virtual aim in the display device based on a combination of output information output from the operation device in accordance with operation instructions from the user to first and second leftward instruction buttons and first and second rightward instruction buttons provided on the operation device, and a display switching step that switches the virtual aim to the switching direction distinguished by the discrimination step.

The program of this invention may be used in an entertainment system that includes a program execution device that executes programs, at least one operation device that inputs operation requests by the user as operation instructions to the program execution device, and a display device that displays images output from the program execution device, the program comprising a discrimination step that distinguishes the switching direction of the virtual aim in the display device based on a combination of output information output from the operation device in accordance with operation instructions from the user to first and second leftward instruction buttons and first and second rightward instruction buttons provided on the operation device, and a display switching step that switches said aim to the switching direction distinguished by said discrimination step.

In this way, to switch the virtual aim leftward, it suffices to operate the buttons aligned on the left side; to switch the virtual aim upward, it suffices to operate the buttons aligned on the top side; one can sensually grasp the direction in which to try to switch the virtual aim; even one who operates the operation device for the first time or one who plays a video game for the first time can switch the virtual aim simply; and if it is applied to a video game such as a shooting game, one can enjoy game development that one does not grow tired of It suffices if the output information is data that includes the ON/OFF component of the buttons and to which the direction components that correspond to the buttons are allocated, and the discrimination means is provided with a switching direction discrimination means that distinguishes said switching direction according to a combination of those components.

It suffices if the output information is data that includes size components that correspond to the force with which said user presses said buttons and to which the direction components that correspond to the buttons are allocated, and the discrimination means is made so as to have a switching direction computation means that computes the switching direction by vector computation based on the direction components and size components. In this case, it suffices if said discrimination means is provided with a movement speed computation means that determines the movement speed of the virtual aim based on the size components The above buttons may be provided on the front part of the operation device. In this case, it suffices to arrange the buttons on the front part of the operation device in positions on the left and right that can be pressed by the fingers of the left and right hands of the user, to allocate left and right direction components that correspond to the left and right arrangement positions of said buttons as the output information that corresponds to the buttons, and to determine the switching direction based on these left and right direction components.

Also, it suffices to arrange the buttons on the front part of the operation device, aligned two each on the top and bottom, in positions on the left and right that can be pressed by the fingers of the left and right hands of the user, to allocate up, down, left, and right direction components that correspond to the up, down, left, and right arrangement positions of the buttons as the output information that corresponds to the buttons, and to determine the switching direction based on these up, down, left, and right direction components.

In this way, the switching direction of the virtual aim on the screen of the display device and the positions of the buttons to be operated will correspond to each other, one can be intuitively aware of which direction the virtual aim is being switched to, one can simply recognize the switching direction of the virtual aim, and even in a video game, such as, for example, shooting game in outer space, in which it is difficult to be aware of a sense of direction and for which skill is considered necessary, one can simply enjoy it.

A method of switching a viewpoint on a display device according to the present invention for switching the viewpoint on the display device in accordance with user operation requests input to an operation device, comprising a step that takes in output information that includes direction components that correspond to the arrangement positions of first and second leftward instruction buttons and first and second rightward instruction buttons provided on said operation device, wherein said output information is output from the operation device in accordance with operation instructions from the user to said first and second leftward instruction buttons and first and second rightward instruction buttons, a discrimination step that distinguishes the switching direction of the viewpoint in the display device based on a combination of said direction components, and a display switching step that switches said viewpoint to said switching direction distinguished by the discrimination step.

In this way, in the present invention, to switch the viewpoint leftward, it suffices to operate the buttons aligned on the left side; to switch the viewpoint upward, it suffices to operate the buttons aligned on the top side; one can sensually grasp the direction in which to try to switch the virtual viewpoint; even one who operates the operation device for the first time or one who plays a video game for the first time can switch the virtual viewpoint simply and easily; and if it is applied to a video game such as a shooting game, one can enjoy game development that one does not grow tired of.

A method that switches the virtual aim on a display device in accordance with user operation requests input to an operation device comprises a step that takes in output information that includes direction components that correspond to the arrangement positions of first and second leftward instruction buttons and first and second rightward instruction buttons provided on said operation device, wherein said output information is output from the operation device in accordance with operation instructions from the user to said first and second leftward instruction buttons and first and second rightward instruction buttons provided on the operation device, a discrimination step that distinguishes the switching direction of the aim in the display device based on a combination of the direction components, and a display switching step that switches the aim to said switching direction distinguished by the discrimination step.

In this way, in this invention, to switch the virtual aim leftward, it suffices to operate the buttons aligned on the left side; to switch the virtual aim upward, it suffices to operate the buttons aligned on the top side; one can sensually grasp the direction in which to try to switch the virtual aim; even one who operates the operation device for the first time or one who plays a video game for the first time can switch the virtual aim simply and easily; and if it is applied to a video game such as a shooting game, one can enjoy game development that one does not grow tired of.

DESCRIPTION OF THE PREFERRED EMBODIMENTS

Figure 1:
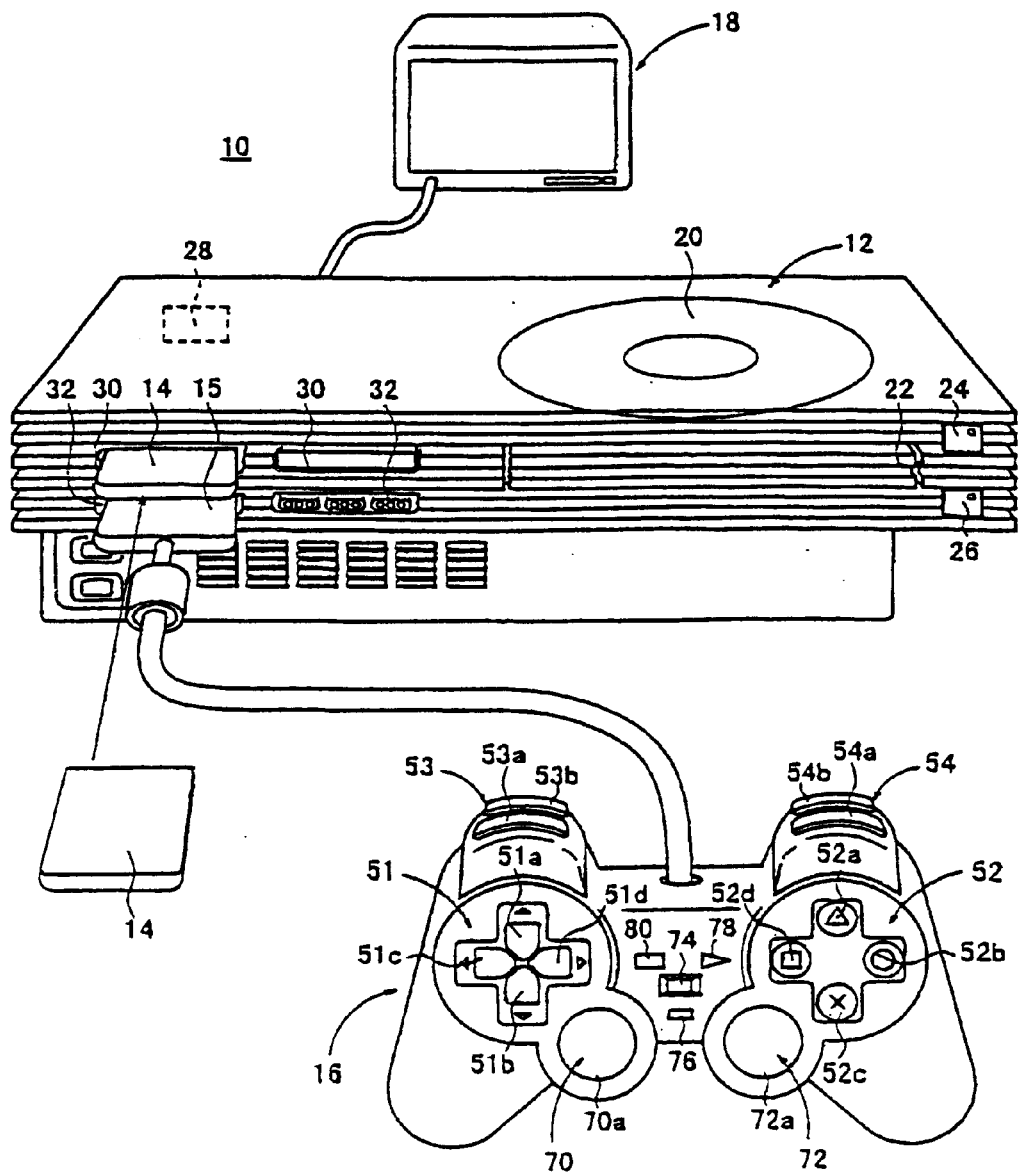
FIG. 1 diagrammatically shows an entertainment system of an embodiment of the present invention.

In the following, with reference to FIGS. 1–18, an embodiment in which the program execution system, program execution device, and recording medium, as well as its method for switching the viewpoint and method for switching the aim, of the present invention will be described as applied to an entertainment system that carries out video games, etc.

An entertainment system 10 in the embodiment of the present invention consists basically of an entertainment device 12, which has functions such as executing programs; a memory card 14, which is a card-type external memory device (external memory) that can freely be attached to and detached from the entertainment device 12; an operation device (controller) 16, which can be freely attached to and detached from entertainment device 12 by a connector 15 and instructs operation requests by the user (also known as the player) to entertainment device 12 as external input; and a monitor (display) 18, which is a television receiver or other display device to which are supplied video and audio signals output from entertainment device 12 and which displays video images and outputs audio sounds.

Arranged on the front panel of the entertainment device 12, which has the shape of flat rectangles piled atop one another, are a disk tray 22, which moves frontward and rearward as a disk mounting unit onto which is mounted an optical disk 20, which is a recording medium for programs and data; a reset switch 24 for arbitrarily resetting, etc. a program, etc. currently in the midst of execution; an open button 26 for pulling out disk tray 22; two insertion openings 30 for memory cards 14; and two controller terminals 32 into which connector 15 of controller 16 is inserted; arranged on the rear surface are a power switch 28 and an AV multi-output terminal (not pictured) which is an output terminal for video and audio and is attached to monitor 18 via an AV (audio-visual) cable.

Built into entertainment device 12 are—besides control functions to read programs and data for computer games (video games) from optical disk 20, which is a CD-ROM, DVD-ROM, or other recording medium on which they are stored and by executing them displaying characters and scenes on monitor 18—various control functions such as playback of images by DVD (digital video disk), which is another optical disk 20, and playback of music by CDDA (compact disk digital audio). It also has the function of executing programs obtained by communication via a communication network, etc. Displayed on monitor 18 as a display device during execution of a game program are three-dimensional computer graphics video generated by entertainment device 12.

In this case, signals from controller 16 are also processed by one of said control functions of entertainment device 12, and its content is reflected in, for example, the movement of characters, the switching of characters, and the switching of scenes on the screen of monitor 18.

On controller 16, first and second operation units 51 and 52 are provided left and right in the middle of the upper surface, third and fourth operation units 53 and 54 are provided on its side surface, and provided left and right on the near side of its upper surface are a left stick 70 and a right stick 72, which are joysticks for performing analog operations.

Although not shown in detail, these left and right sticks 70 and 72 are constituted so that a vibration motor is arranged in their drive unit and vibration is imparted to left and right sticks 70 and 72 under program instruction.

First operation unit 51 is a pressing operation unit for, for example, imparting actions to characters, etc. displayed on the screen of monitor 18; it consists of four operation keys (also called direction keys) 51a, 51b, 51c, 51d whose functions are set by programs, etc. recorded on optical disk 20 and that have the function of moving a character, etc. up, down, left, right, etc. Direction key 51a is also called the upward key, direction key 51b is also called the downward key, direction key 51c is also called the leftward key, and direction key 51d is also called the rightward key.

Second operation unit 52 has four cylindrical operation buttons 52a, 52b, 52c, 52d for pressing operation; identifications marks "Δ", "○", "X", "□" are attached to the tops of operations buttons 52a–52d, respectively, and operation buttons 52a–52d are also called, respectively, Δ (triangle) button 52a, ○ (circle) button 52b, X (cross) button 52c, and □ (square) button 52d.

The functions of operation buttons 52a–52d of this second operation unit 52 are set by programs, etc. recorded on optical disk 20, and assigned to operation buttons 52a–52d are functions such as moving a character's left arm, right arm, left leg, and right leg.

Third and fourth operation units 53 and 54, which have the same structure, each have operation buttons for pressing operation aligned two each on top and bottom: operation button (also called L1 button or first leftward instruction button) 53a and operation button (also called L2 button or second leftward instruction button) 53b, as well as operation button (also called R1 button or first rightward instruction button) 54a and operation button (also called R2 button or second rightward instruction button) 54b. The functions of these third and fourth operation units 53 and 54 are likewise set by programs recorded on optical disk 20, and assigned to them are, for example, the function of causing a character to perform a special operation or the function of changing a character.

Left stick 70 and right stick 72 each have a signal input element such as a variable resistor that can rotate 360° about the operation axis. These left and right sticks 70 and 72 return to their central position by elastic members (not pictured). In this central position, left and right sticks 70 and 72 each have an operation button (L3 button 70a, R3 button 72a) function as fifth and sixth operation units for pressing operation, respectively.

By rotation operation of left and right sticks 70 and 72, one can input command signals that make it possible to perform analog movements such as causing characters, etc. to rotate as they move, or vary their speed as they move, or change their shapes. In this embodiment, by operating left stick 70 it is possible to move a character in the direction of the arrow cursor, as described below.

Figure 2:
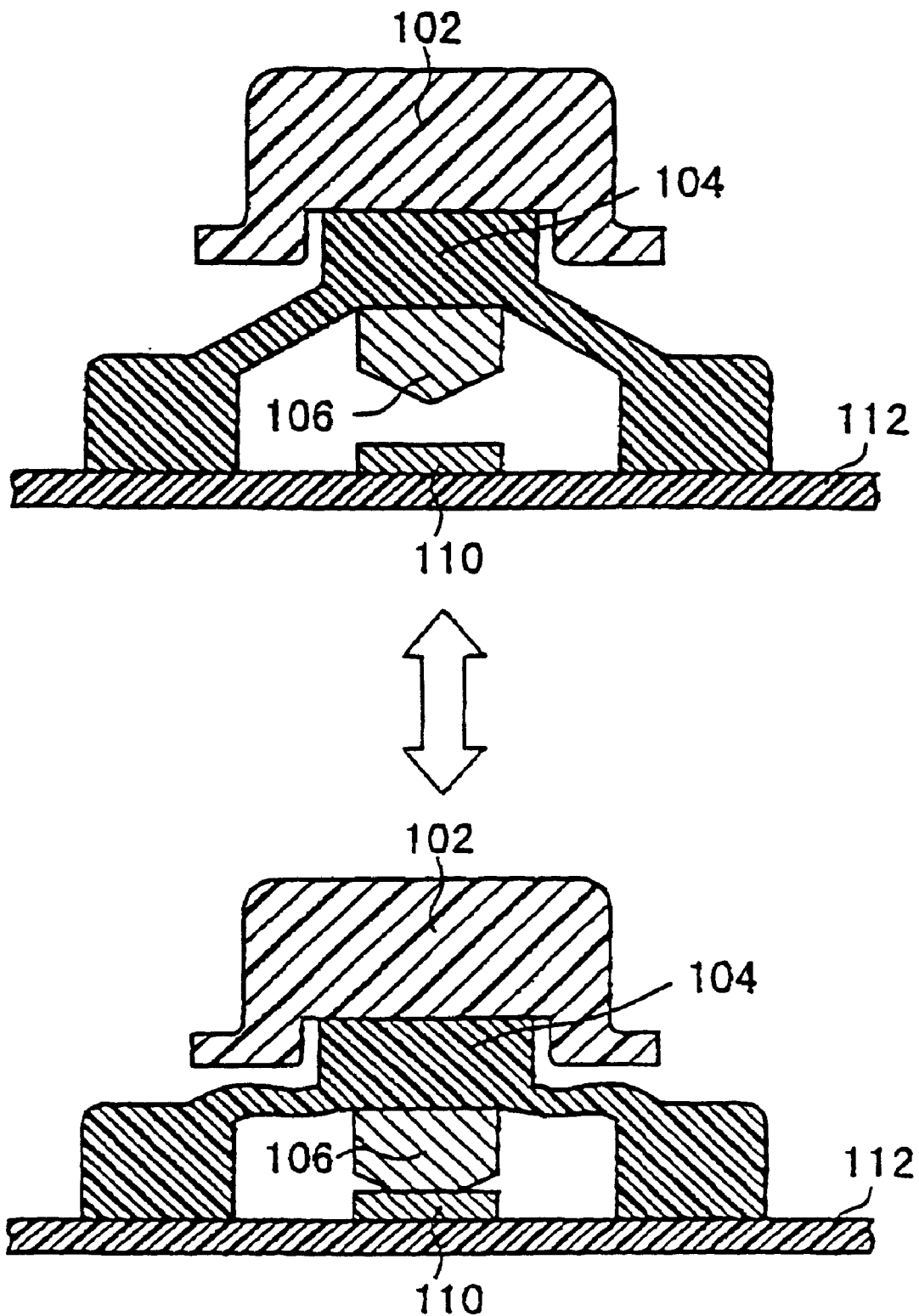
FIG. 2 is a cross-sectional view for explaining the operation of a pressure-sensitive element.
Figure 3:
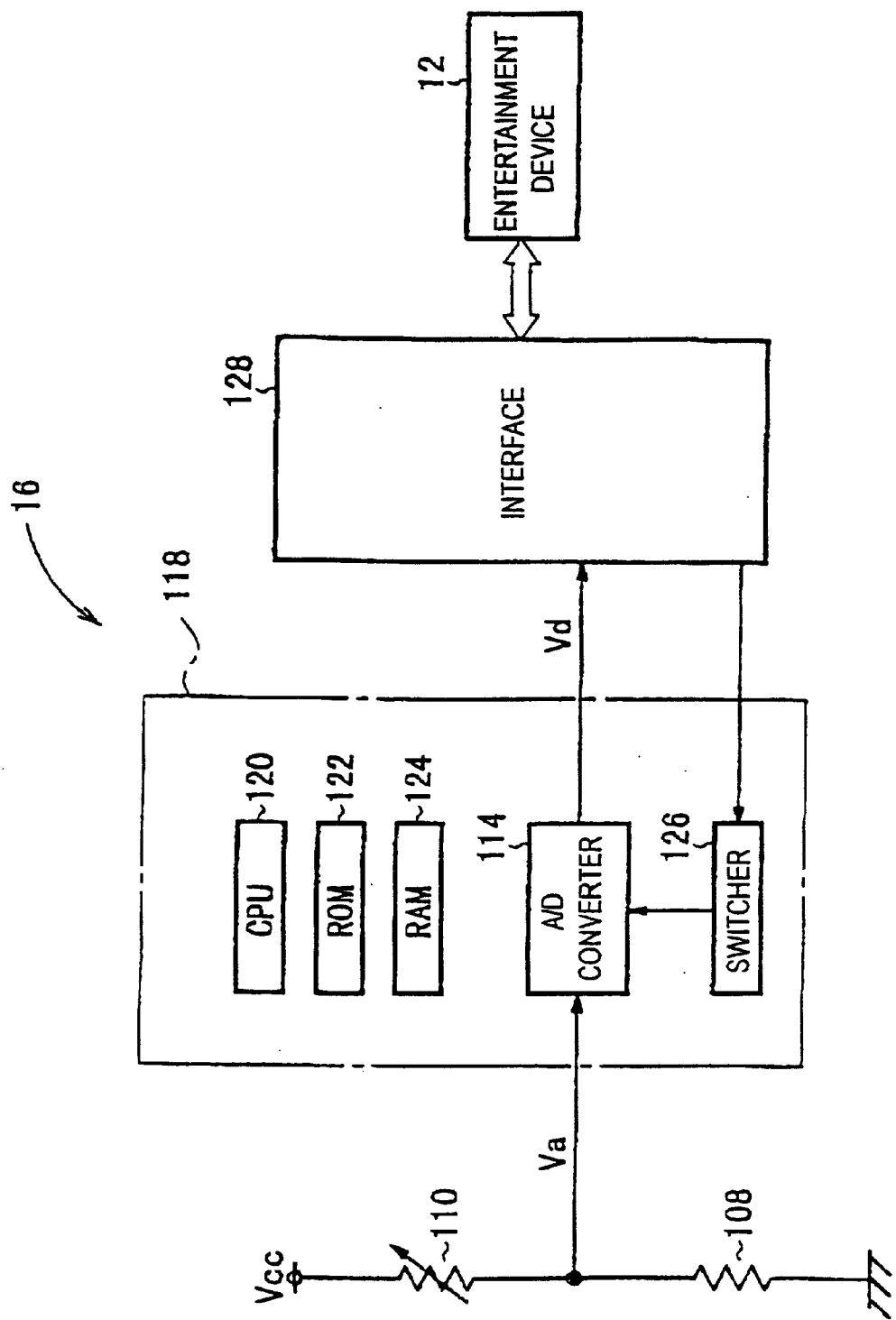
FIG. 3 is a circuit block diagram for explaining the operation of a controller.

As shown in FIGS. 2 and 3, on the back surface of each of direction keys 51a–51d that constitute the first operation unit 51, operation buttons 52a–52d that constitute the second operation unit 52, L1 and L2 buttons 53a and 53b and R1 and R2 buttons 54a and 54b that constitute the third and fourth operation units 53 and 54, and operation buttons 70a and 72a that constitute the fifth and sixth operation units (these are typically called operation elements 102) is attached via an insulating flexible body 104 an electrically conductive member 106 that is formed in mountain shape with its peak in the middle, and arranged in a position opposite each electrically conductive member 106 is a resistor 110, whose one end is connected to voltage source Vcc and whose other end is connected to a fixed resistor 108. Resistor 110 is arranged on an insulating substrate 112, and the other end of fixed resistor 108 is grounded.

In this case, when any of direction keys 51a–51d, operation buttons 52a–52d, L1 and L2 buttons 53a and 53b and R1 and R2 buttons 54a and 54b, and operation buttons 70a and 70b (operation elements 102) is pressed, electrically conductive member 106 makes contact with opposite resistor 110, the resistance value of resistor 110 apparently changes in correspondence with the area of contact with electrically conductive member 106 in accordance with the pressing pressure, and partial voltage value (analog signal) Va of resistors 110 and 108 changes and becomes the signal input into A/D converter 114.

Thus the pressure-sensitive element consists of the electrically conductive member 106 and resistor 110, and the electrical resistance of this pressure-sensitive element varies according to the pressing force imparted from operation element 102. FIG. 2 shows the operation of the pressure-sensitive element as an element that outputs a signal output that is proportional to the pressing force, and FIG. 3 shows the composition of the main parts of controller 16.

As shown in FIG. 3, controller 16 has an MPU (microprocessor unit) 118 as a control means, and within this MPU 118 it has a CPU 120 as a control means and ROM 122 and RAM 124, which are mutually connected to this. MPU 118 also has a switcher 126 and an A/D converter 114, whose operation is controlled by CPU 120. Analog signal (divided voltage value) Va, which is output from the output terminal of resistor 110, is input into AD converter 114 and is converter to digital signal Vd.

Digital signal Vd output from A/D converter 114 is sent to entertainment device 12 via an interface 128 provided on an internal board of controller 16, and for example the actions of game characters are executed by this digital signal Vd.

Changes in the level of analog signal Va output from the output terminal of resistor 110 correspond to the changes in the pressing force received from operation element 102 as stated above. Digital signal Vd output from A/D converter 114 corresponds to the pressing force by the user on operation element 102. If the actions, etc. of game characters are controlled by digital signals having such a relationship with the user's pressing operations, it is possible to realize analog-like actions that are smoother than they would be by control by two-value (or binary) digital signals "1" and "0".

Here, controller 16 has a configuration that controls switcher 126 via interface 128 by control signals sent from entertainment device 12 based on a program recorded on optical disk 20. That is, when a program recorded on optical disk 20 is executed, according to the content of the program, a control signal is output from entertainment device 12 that either causes A/D converter 114 to function as a means that outputs a digital signal Vd that takes on any of many values, such as from 0 to 255, or causes it to function as a means that outputs an on-off digital signal Vd that takes on either the value "0" or the value "1". Based on this control signal, switcher 126 selects and switches the function of A/D converter 114 (two-value output or multi-value output). Therefore whether it shall be set to two-value output or multi-value output is determined by the program.

In FIG. 1, left and right sticks 70 and 72 can be used by switching between aforesaid first and second operation units 51 and 52. This switching is done by analog mode switch 74. When left and right sticks 70 and 72 are selected by analog mode switch 74, display unit 76 flashes to display the selection state of left and right sticks 70 and 72.

Besides the foregoing, controller 16 also has a start button (start switch) 78, which indicates the start of a game, etc., and a selector button (selector switch) 80, which selects the game's degree of difficulty, etc.

Figure 4:
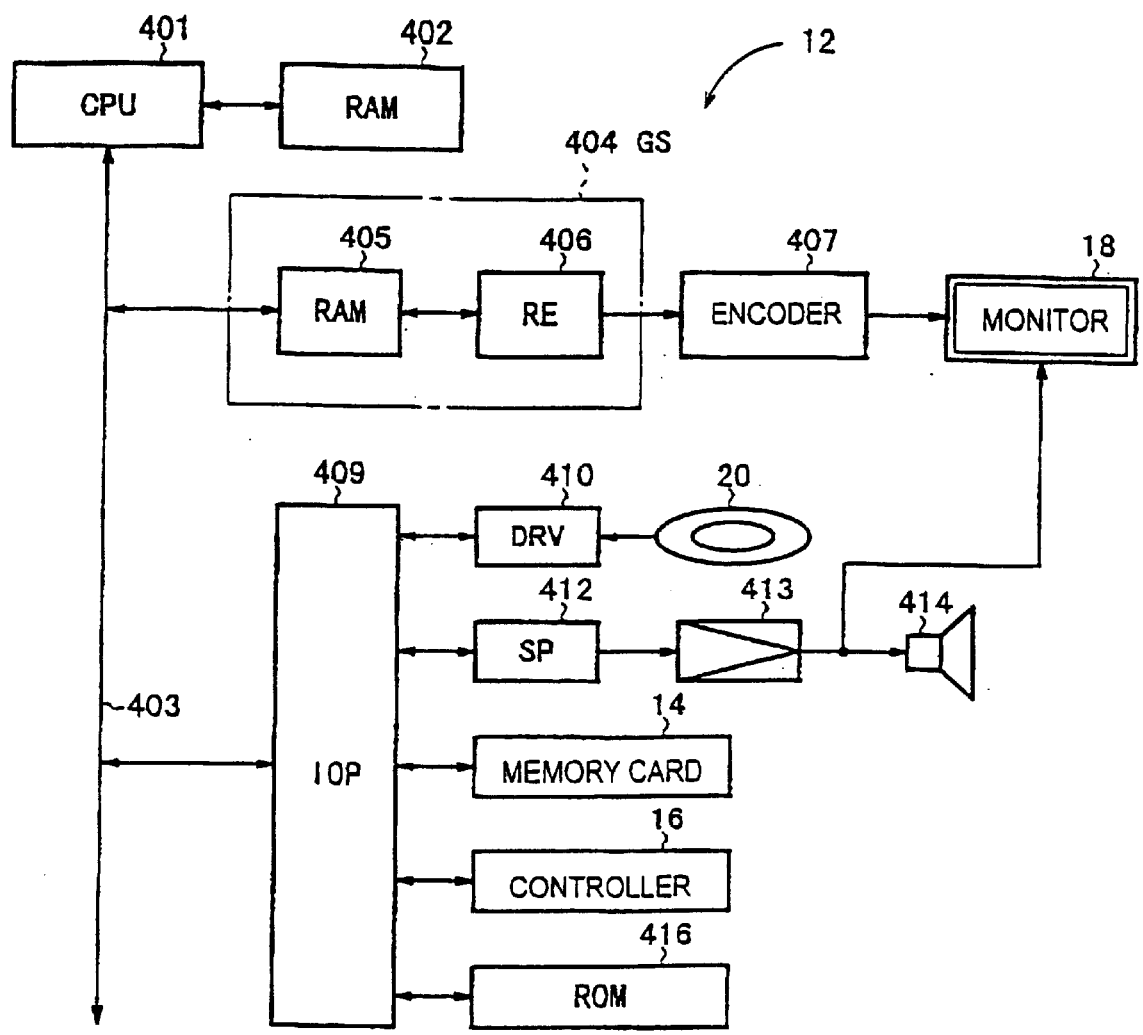
FIG. 4 is a block diagram of an entertainment system.

Next, referring to the block diagram in FIG. 4, we explain the internal composition and general operation of entertainment system 10 shown in FIG. 1.

RAM 402 as a semiconductor memory and a bus 403 are each connected to a CPU 401 as an execution unit (execution means), which is a computer. In this case, RAM 402 also functions as a memory unit that sequentially stores a program that includes data recorded on optical disk 20, and CPU 401 also functions as an execution unit that executes a program in RAM 402 (optical disk 20) as this memory unit.

Connected to bus 403 are a graphic synthesizer (GS) 404 and an input-output processor (IOP) 409. Included in GS 404 are RAM 405, which includes a frame buffer, a Z buffer, and a texture memory, etc., and a rendering engine 406, which has rendering functions that include the function of drawing to the frame buffer in this RAM 405.

Monitor 18 as external equipment is connected to GS 404, which is thus constituted, via an encoder 407 for, for example, converting digital RGB signals, etc. to the NTSC-standard television system.

Connected to IOP 409 are a driver (DRV) 410 for playing and decoding data recorded on optical disk 20, a sound processor (SP) 412, the memory card 14 as external memory that consists of flash memory, controller 16, and ROM 416, on which is recorded the operating system, etc. SP 412 is connected via an amplifier 413 to a speaker 414 and monitor 18 as external equipment, and supplies audio signals.

Here, memory card 14 is a card-type external memory device that consists of, for example, a CPU or gate array and flash memory; via its insertion opening 30 it can be freely attached to and detached from entertainment device 12 shown in FIG. 1. This memory card 14 stores the intermediate state of games, and programs, etc. for DVD playback are stored on it.

Controller 16 is for giving entertainment device 12 commands (two-value commands and multi-value commands) by pressing multiple buttons on said controller 16. Driver 410 has a decoder for decoding images encoded based on the MPEG (Moving Picture Experts Group) standards.

Next, a typical way in which images are displayed on monitor 18 by operation of controller 16 will be described.

As a premise, it is assumed that object data consisting of polygon vertex data, texture data, etc. recorded on optical disk 20, as well as world coordinate WC data for this object data, are read via driver 410 and are held in CPU 401 and RAM 402.

Figure 5:
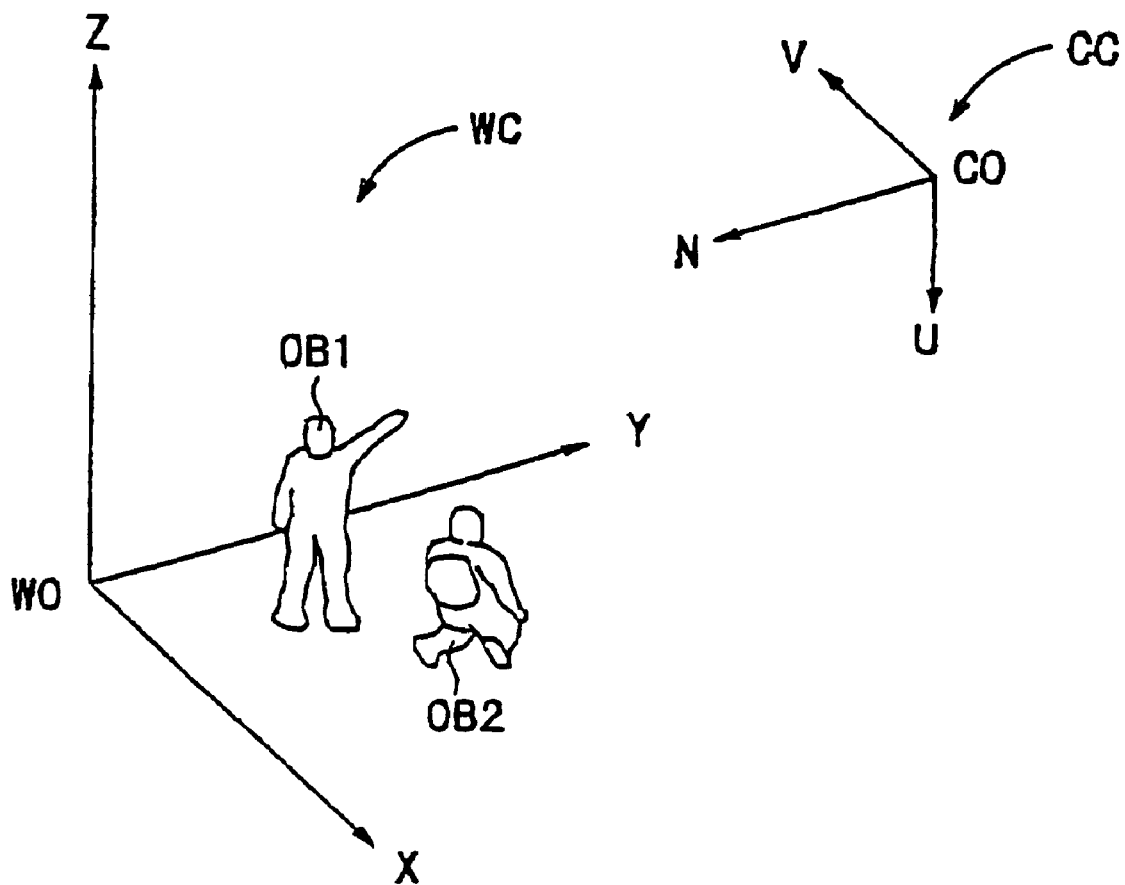
FIG. 5 is an explanatory diagram showing the relationship between world coordinates and camera coordinates.

FIG. 5 shows a typical state in which objects OB1 and OB2 according to object data are arranged on the three-dimensional world coordinates WC of the three orthogonal axes XYZ of world coordinate origin WO.

When the below-described character selection and change instructions from the player, who is the user, are input into entertainment device 12 via controller 16, CPU 401 computes, based on these instructions, the position and orientation (or direction) with respect to the viewpoint of objects on the three-dimensional camera coordinates CC of the three orthogonal axes VUN of camera coordinate origin CO. Camera coordinate origin CO of camera coordinates CC is set to, for example, the center of the below-described screen. In this way, the polygon vertex data of an object specified by the X, Y, Z coordinate values of three orthogonal axes is changed respectively into camera coordinates CC.

Figure 6:
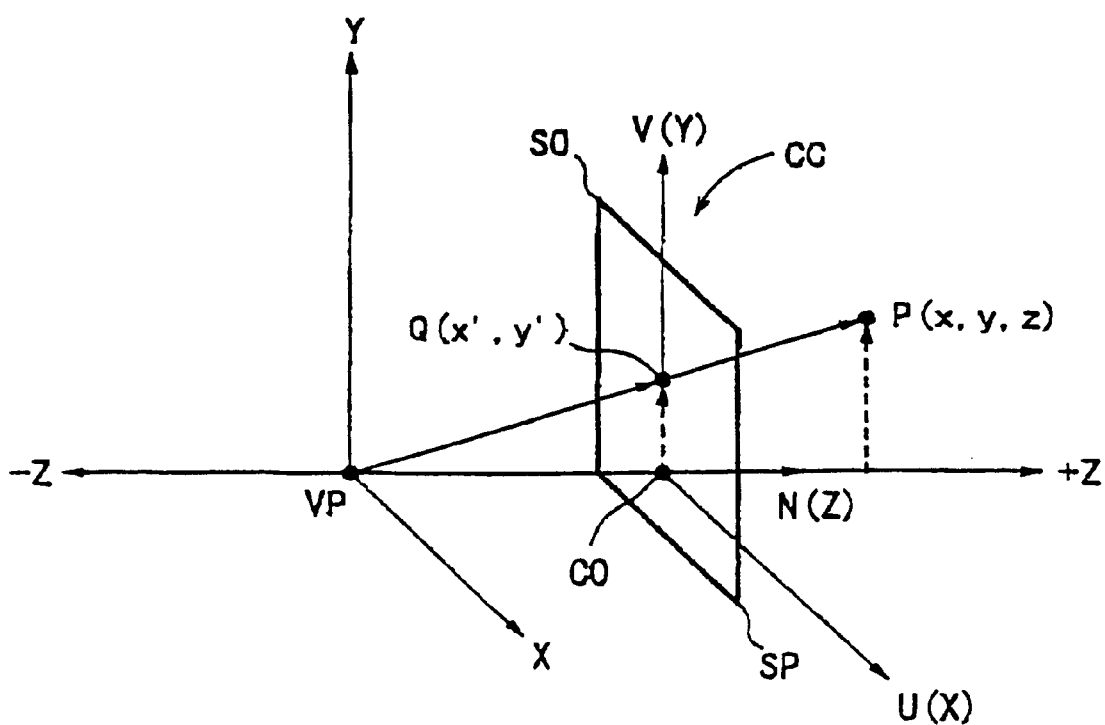
FIG. 6 is an explanatory diagram showing the relationship between camera coordinates and screen coordinates.

Next, as shown in a typical way by single arrow lines in FIG. 6, polygon vertex data P(x, y, z) after the change to camera coordinates CC is converted to two-dimensional coordinate data Q(x', y') on screen SP defined by screen coordinates SC of screen coordinate origin SO (for example, the point at the upper left of screen SP), by perspective conversion (or transformation) processing in which viewpoint VP is taken as the standard.

The post-transformation two-dimensional XY coordinate data, Z data, and texture data are supplied to GS 404. GS 404 performs drawing processing by performing rendering based on the post-transformation two-dimensional XY coordinate data and Z data, and sequentially drawing the texture data to RAM 405 as memory (in this case, to the frame buffer). After the image of one frame completed by this drawing processing is encoded by encoder 407, the drawn texture data is supplied to monitor 18 and is displayed as a three- or two-dimensional image on its screen.

Next, with reference to FIGS. 7A–18, the characteristic functions that entertainment system 10 of this embodiment has will be described.

Functions that entertainment system 10 of this embodiment has are the viewpoint switching processing function and the aim switching processing function. The viewpoint switching processing function means switching the viewpoint on monitor 18 to a direction in accordance with user operation input (operation instructions input through operation device 16) to L1 button 53a and L2 button 53b as well as R1 button 54a and R2 button 54b. The aim switching processing function, on the other hand, means switching the aim to be displayed on monitor 18 to a direction in accordance with user operation input to L1 button 53a and L2 button 53b as well as R1 button 54a and R2 button 54b. That is, the viewpoint switching processing function and the aim switching processing function set the switching (movement) direction of a given point on monitor 18 according to the operation input to L1, L2, R1, R2 buttons 53a, 53b, 54a, 54b.

In the following, several specific examples of the viewpoint switching processing function and the aim switching processing function will be described.

First, the first viewpoint switching processing function and the first aim switching processing function cause L1 button 53a and L2 button 53b as well as R1 button 54a and R2 button 54b to function as direction indication (or instruction) buttons, and through switcher 126 in FIG. 3 they cause A/D converter 114 to function as a means to output a two-value on-off digital signal Vd that takes on the value "0" or "1". That is, when L1, L2, R1, R2 button 53a, 53b, 54a, 54b is pressed, for example value "1" is output from A/D converter 114, and when it is not pressed, value "0" is output.

Figure 7A:
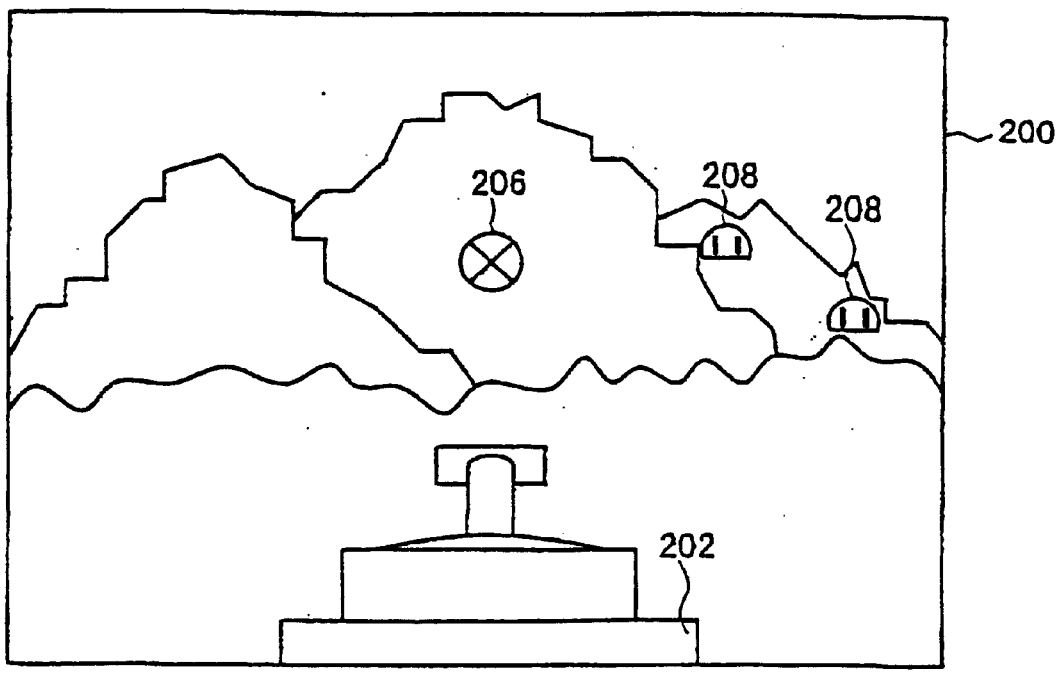
FIG. 7A is an explanatory diagram showing an image example displayed on the monitor screen before switching the viewpoint.
Figure 7B:
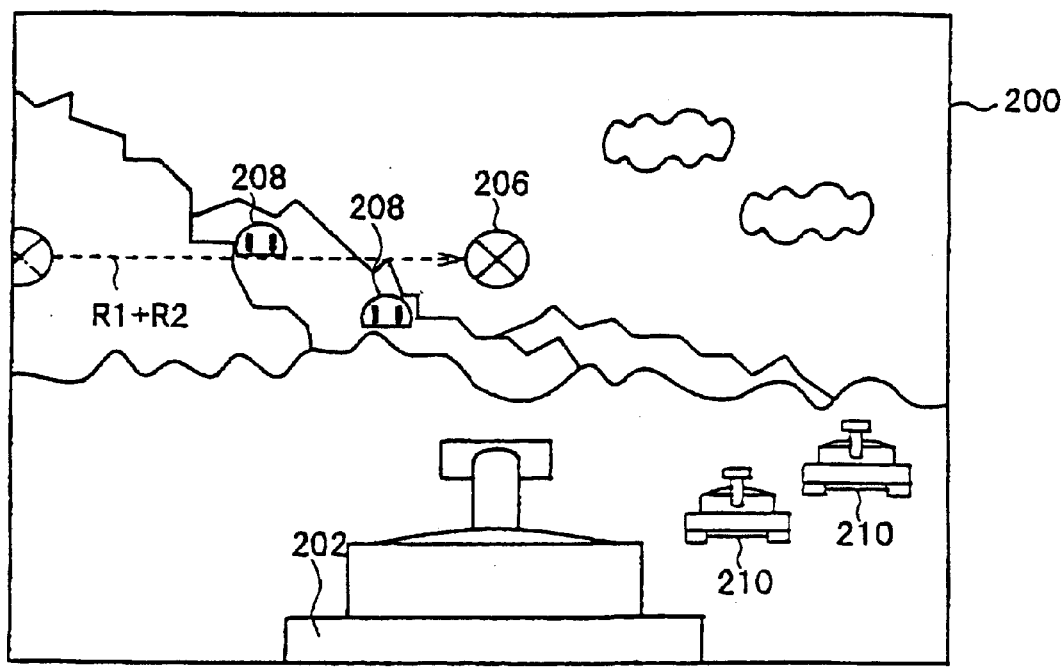
FIG. 7B is an explanatory diagram showing the image example after the viewpoint has been switched.

As shown in FIGS. 7A and 7B, the first viewpoint switching processing function switches the user's viewpoint on a screen 200 of monitor 18 by moving the display position of the background objects and target objects (the below-described virtual missile firing bases 208 and virtual enemy tanks 210) displayed on screen 200. The user's viewpoint is, for example, the viewpoint as seen from the object (in the example of FIGS. 7A and 7B, virtual tank 202) to be operated by the user. In other word, the user's viewpoint is the viewpoint of the pilot, etc. of the object.

In this case, the switching direction of the viewpoint corresponding to the combination of L1 button 53a and L2 button 53b as well as R1 button 54a and R2 button 54b is determined as in, for example, the example shown in FIG.

8 (the details are explained below). For example, from the state of FIG. 7A, by the user simultaneously pressing R1 button 54a and R2 button 54b, the background objects and target objects move leftward on screen 200, as shown in FIG. 7B. That is, the user's viewpoint switches from the position shown in FIG. 7A to the position to the right shown in FIG. 7B.

Up, down, left, right direction components are assigned to L1 button 53a and L2 button 53b as well as R1 button 54a and R2 button 54b in accordance with their up, down, left, right arrangement positions (see FIG. 1). For example, the direction components upper left, lower left, upper right, lower right, in which screen 200 of monitor 18 is taken as the standard, are assigned respectively to L1, L2, R1, R2 buttons 53a, 53b, 54a, 54b. And output information output from operation device 16 corresponding to the operation of pressing each of L1, L2, R1, R2 buttons 53a, 53b, 54a, 54b is two-value information that includes an ON/OFF component and the direction component with respect to each said button.

The switching direction of the viewpoint is determined as the combination of the direction components that correspond to pressed L1, L2, R1, R2 buttons 53a, 53b, 54a, 54b. Specifically, each L1, L2, R1, R2 button 53a, 53b, 54a, 54b independently functions as a button for specifying a prescribed direction (for example, a diagonal direction), and for each predetermined combination, they function as buttons for specifying a prescribed direction (for example, vertical or horizontal direction).

Figure 8:
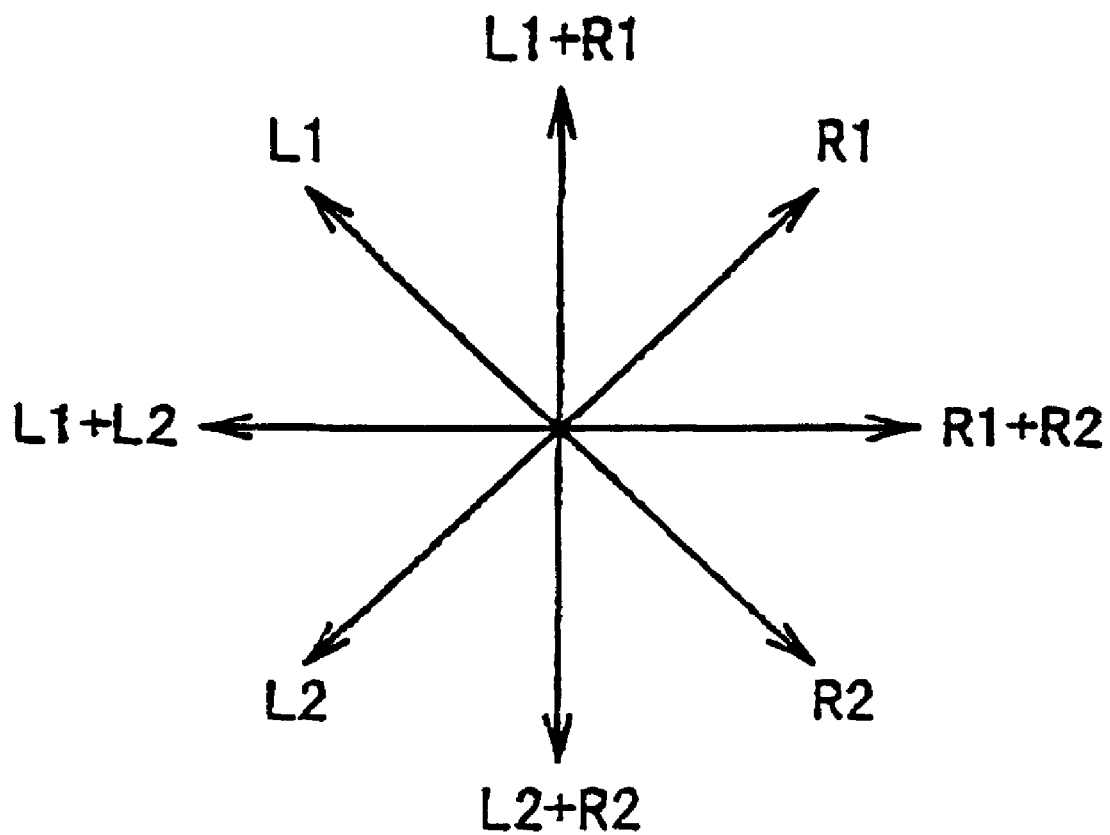
FIG. 8 is an explanatory diagram showing the relationship between the combination of operation inputs with respect to the L1 button and L2 button and the R1 button and R2 button, and the switching direction of the viewpoint or the aim on the display device.

As shown in FIG. 8, for example, if one presses only L1 button 53a, the viewpoint switches to the L1 direction (for example, to the upper left at 45 degrees), and if one simultaneously presses L1 button 53a and L2 button 53b, the viewpoint switches to the L1+L2 direction (for example, leftward). Similarly, the viewpoint switches to the L2 direction (for example, to the lower left at 45 degrees) if one presses only L2 button 53b, to the L2+R2 direction (for example, downward) if one simultaneously presses L2 button 53b and R2 button 54b, to the R2 direction (for example, to the lower right at 45 degrees) if one presses only R2 button 54b, to the R1+R2 direction (for example, rightward) if one simultaneously presses R1 button 54a and R2 button 54b, to the R1 direction (for example, upper right at 45 degrees) if one presses only R1 button 54a, and to the L1+R1 direction (for example, upward) if one simultaneously presses L1 button 53a and R1 button 54a. When viewpoint switching processing is done, the position of aim 206 of a virtual tank 202, described below, does not move.

Figure 9A:
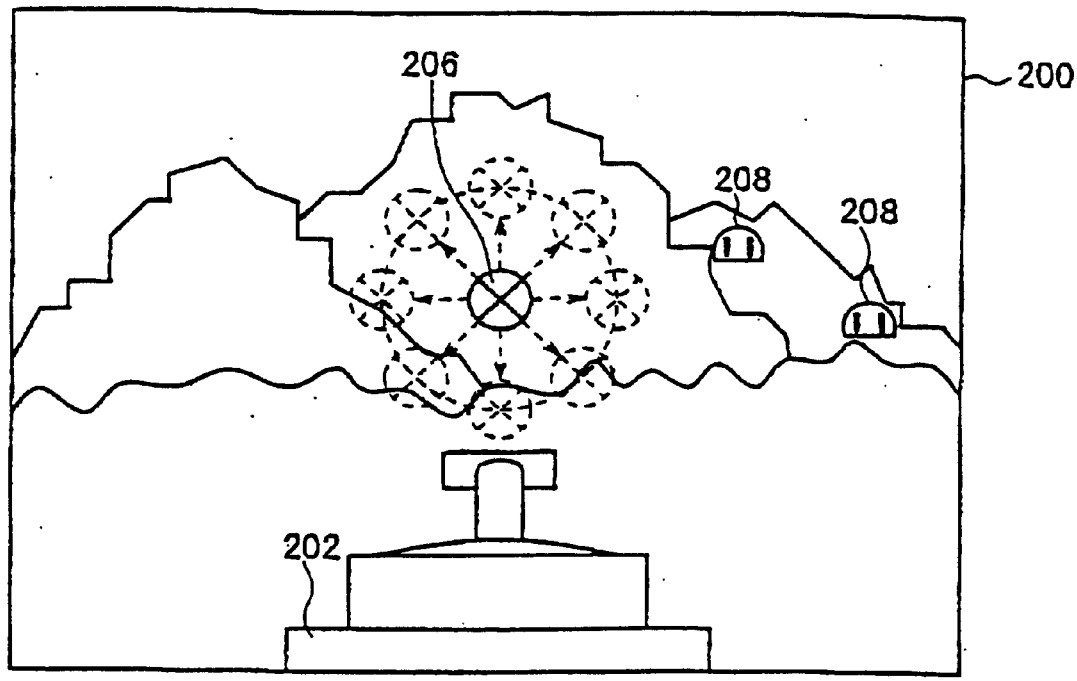
FIG. 9A is an explanatory diagram showing an image example displayed on a monitor screen before switching the aim.
Figure 9B:
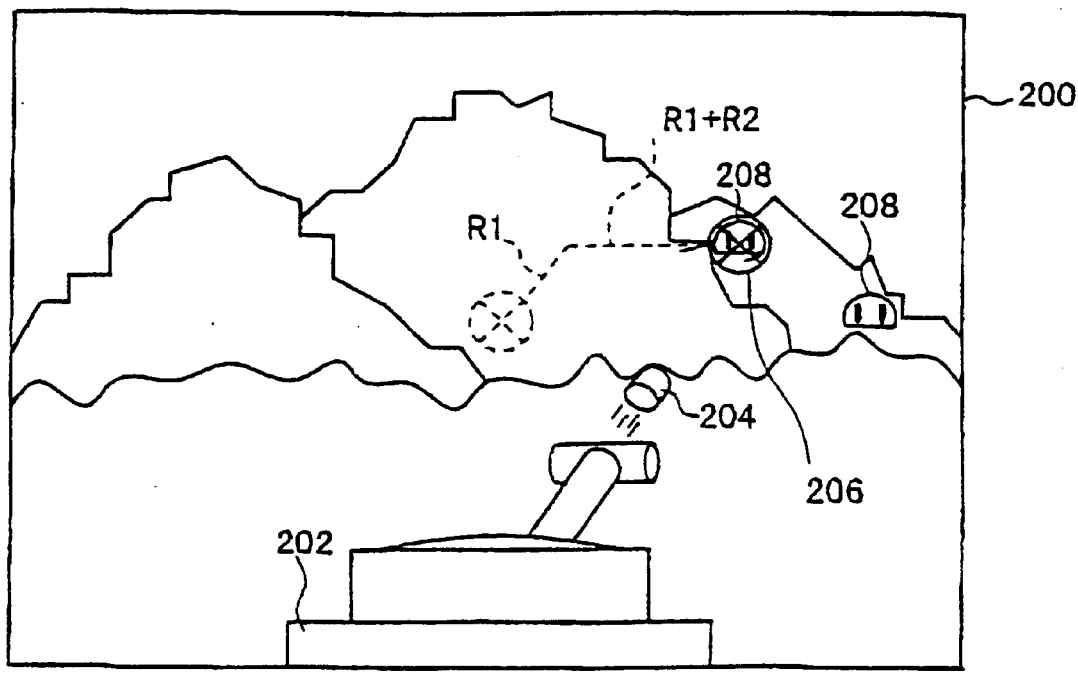
FIG. 9B is an explanatory diagram showing the image example after the aim has been switched.

Meanwhile, the first aim switching processing function switches aim 206 by moving the position of this aim 206 for firing a virtual projectile such as shell 204 or firing a virtual laser beam, etc. from virtual tank 202 displayed on screen 200, as shown in FIGS. 9A and 9B.

The position of aim 206 is switched from the state of FIG. 9A to the upper right on screen 200 as shown in FIG. 9B by, for example, pressing only R1 button 54a, then simultaneously pressing R1 button 54a and R2 button 54b. By firing shell 204 from tank 202 when aim 206 is aligned on, for example, a virtual missile firing base 208 as a target, for example shell 204 will make a direct hit on missile firing base 208, and said missile firing base 208 will be destroyed, and the game will thus develop.

In this case, the switching direction of aim 206 corresponding to a combination of L1 button 53a and L2 button 53b as well as R1 button 54a and R2 button 54b is the same as, for example, the example of the viewpoint switching processing function shown in FIG. 8.

Next, with reference to FIG. 10, the software (first scene creation means 300) for realizing the first viewpoint switching processing function and first aim switching processing function will be described.

The software including the first scene creation means 300 is supplied to entertainment system 10 from, for example, a random-access recording medium such as a CD-ROM or memory card 14, as well as by way of a network. Here the description will be provided assuming a case in which the software is run after having been read into entertainment device 12 from optical disk 20, such as a CD-ROM. That is, first scene creation means 300 is run on CPU 401 by, for example, downloading it into RAM 402 of entertainment device 12, after going through prescribed processing, from a specified optical disk 20 previously played on entertainment device 12 (see FIG. 4).

Figure 10:
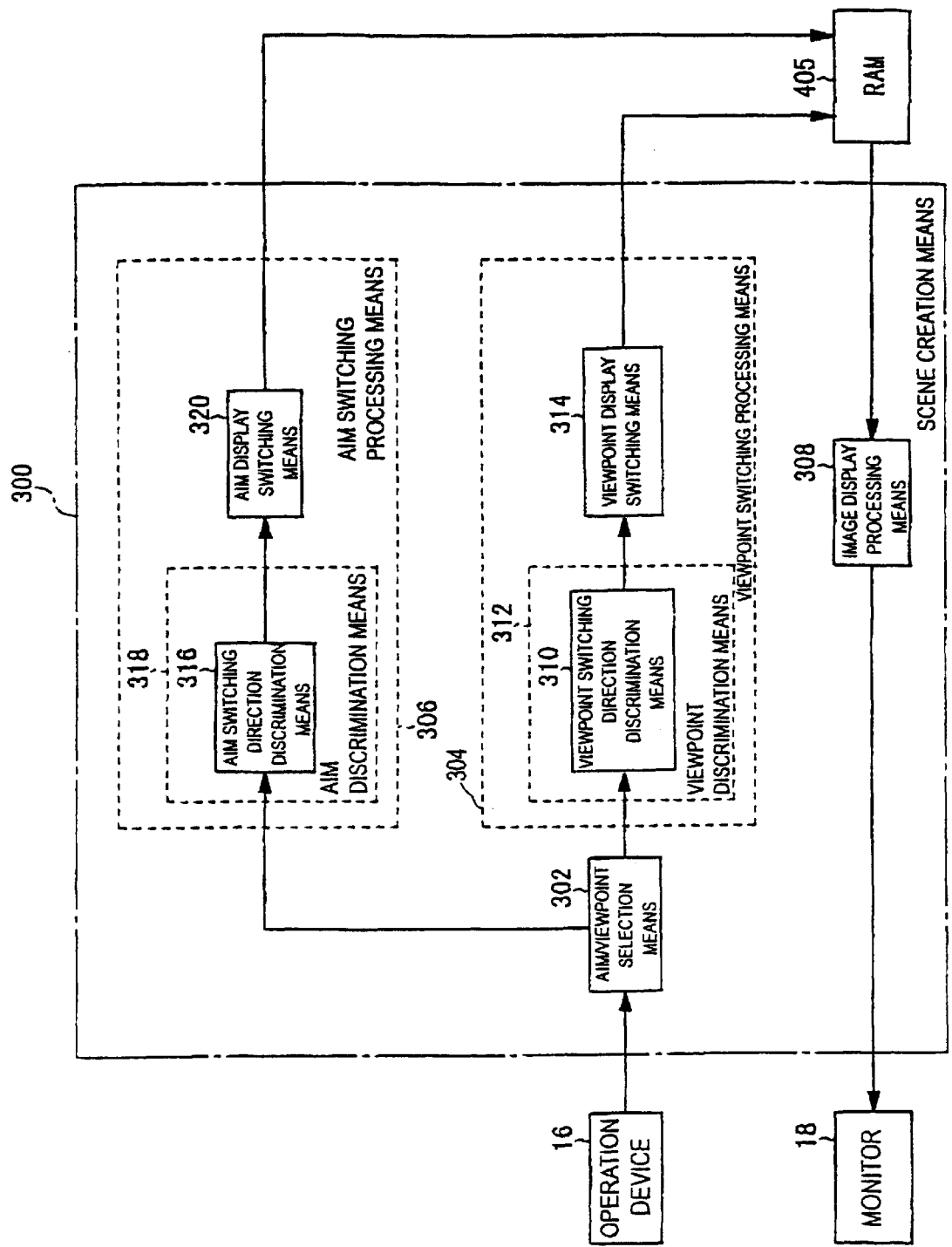
FIG. 10 is a functional block diagram showing the composition of the first scene creation means.

As shown in FIG. 10, the first scene creation means 300 has an aim/viewpoint selection means 302, which judges whether the operation input from the user is a viewpoint switching instruction or an aim switching instruction; viewpoint switching processing means 304, which performs viewpoint switching processing if the result of the judgment in aim/viewpoint selection means 302 is that it is a viewpoint switching instruction; aim switching processing means 306, which performs aim switching processing if the result of the judgment in aim/viewpoint selection means 302 is that it is an aim switching instruction; and image display processing means 308, which outputs to monitor 18 image data drawn to RAM (image memory) 405 after having gone through processing by viewpoint switching processing means 304 or aim switching processing means 306, and displays said image data on the screen of monitor 18.

Viewpoint switching processing means 304 has a viewpoint discrimination (or decision) means 312 which has a viewpoint switching direction discrimination (or decision) means 310 that distinguishes (or decides) the direction to switch (or move) the viewpoint based on user operation input to L1, L2, R1, R2 buttons 53a, 53b, 54a, 54b, and viewpoint display switching means 314, which performs viewpoint switching processing in accordance with the switching direction distinguished by viewpoint switching direction discrimination means 310.

Aim switching processing means 306 has an aim discrimination (or decision) means 318 which has an aim switching direction discrimination (or decision) means 316 that distinguishes (or decides) the direction to switch (or move) the aim to based on user operation input to L1, L2, R1, R2 buttons 53a, 53b, 54a, 54b, and aim display switching means 320, which performs aim switching processing in accordance with the switching direction distinguished by aim switching direction discrimination means 316.

Next, with reference to the flowcharts in FIGS. 11 and 12, the processing operation of first scene creation means 300 will be described.

Figure 11:
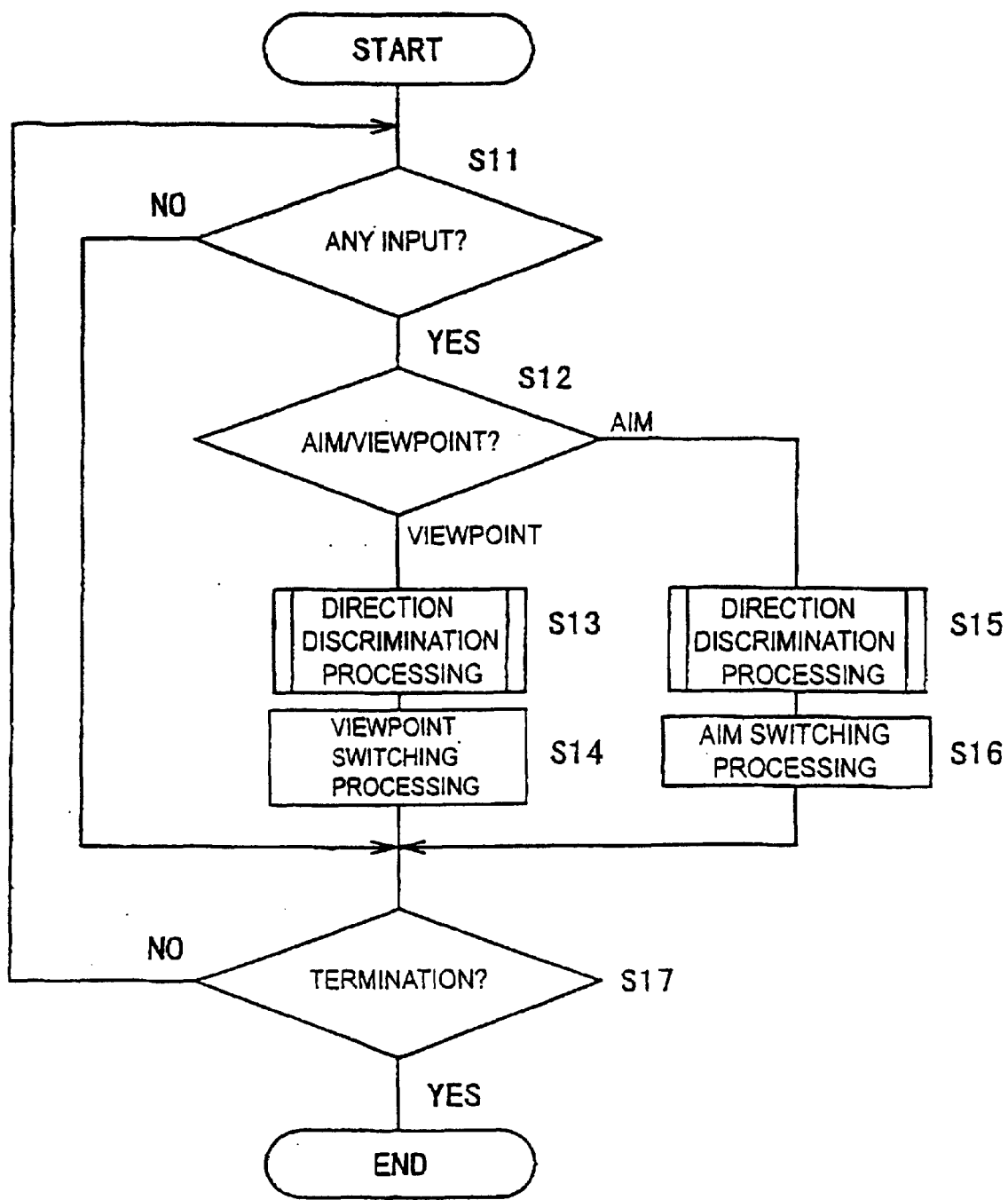
FIG. 11 is a flowchart showing the processing operation of the first scene creation means.

This first scene creation means 300 first decides, in step S11 in FIG. 11, by means of aim/viewpoint selection means 302, whether there is any operation input to any of L1, L2, R1, R2 buttons 53a, 53b, 54a, 54b of operation device 16. If there is any operation input to these L1, L2, R1, R2 buttons 53a, 53b, 54a, 54b, one proceeds to step S12, and if there is no input, one proceeds to step S17. After temporarily storing, in a buffer, etc., the operation input information corresponding to the buttons, etc. to which there were input requests from entertainment device 12, operation device 16 sends this operation input information as output information to entertainment device 12.

Then, in step S12, it is decided by means of aim/viewpoint selection means 302 whether the operation input to operation device 16 is a viewpoint switching instruction or an aim switching instruction. This decision is made according to whether there is operation input to the button (for example, X button 52c) on operation device 16 to which the viewpoint switching/aim switching selection function is allocated. For example, if X button 52c has been pressed, it is taken that an instruction has been given for viewpoint switching, and one proceeds to step S13. If, on the other hand, X button 52c has not been pressed, it is taken that an instruction has been given for aim switching, and one proceeds to step S15.

In step S13, by means of viewpoint switching direction discrimination means 310 of viewpoint discrimination means 312, the switching direction of the viewpoint indicated as operation input to operation device 16 is distinguished. Specifically, in step S21 in FIG. 12, the user's operation input to L1, L2, R1, R2 buttons 53a, 53b, 54a, 54b is taken in, and the combination of these operation inputs is distinguished. For example, it is distinguished whether the combination of user operation input is the input corresponding to only L1 button 53a, L1 button 53a and L2 button 53b, only L2 button 53b, L2 button 53b and R2 button 54b, only R2 button 54b, R1 button 54a and R2 button 54b, only R1 button 54a, L1 button 53a and R1 button 54a, or some other input (combination).

And if the combination is only L1 button 53a, one proceeds to step S22, and the switching direction of the viewpoint is set to the L1 direction in FIG. 8 (toward the upper left). Similarly, if the combination is L1 button 53a and L2 button 53b, in step S23 it is set to the L1+L2 direction in FIG. 8 (leftward); if only L2 button 53b, in step S24 it is set to the L2 direction in FIG. 8 (toward the lower left); if L2 button 53b and R2 button 54b, in step S25 it is set to the L2+R2 direction in FIG. 8 (downward); if only R2 button 54b, in step S26 it is set to the R2 direction in FIG. 8 (toward the lower right); if R1 button 54a and R2 button 54b, in step S27 it is set to the R1+R2 direction in FIG. 8 (rightward); if R1 button 54a only, in step S28 it is set to the R1 direction in FIG. 8 (toward the upper right); and if L1 button 53a and R1 button 54a, in step S29 it is set to the L1+R1 direction in FIG. 8 (upward). If the operation input is an input that is different from the foregoing, no setting of the switching direction of the viewpoint is made.

Next, one proceeds to step S14 in FIG. 11, and by means of viewpoint display switching means 314, the viewpoint is switched to the direction set in step S13 (steps S22–S29 in FIG. 12) (see FIGS. 7A and 7B).

Figure 12:
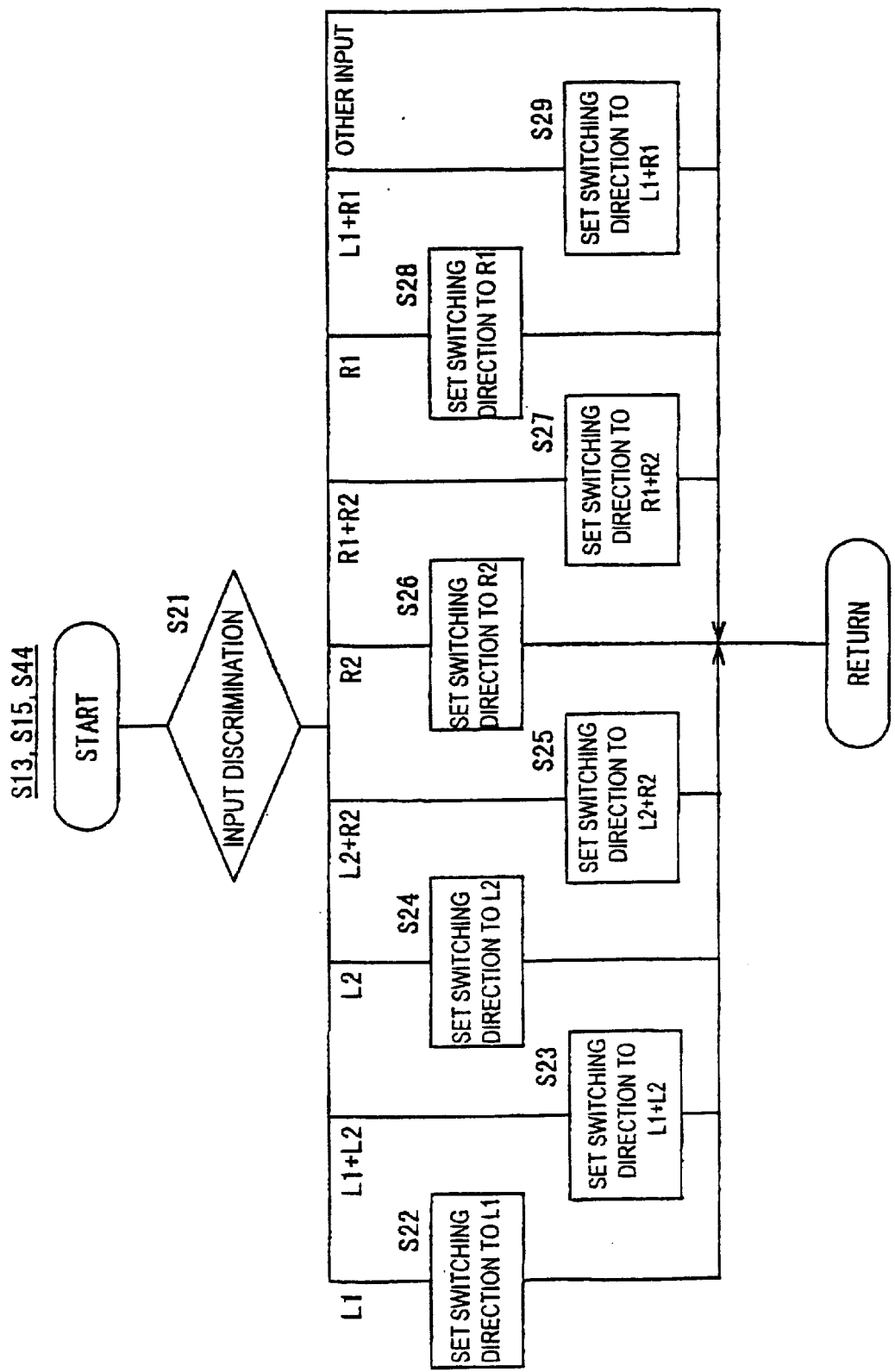
FIG. 12 is a flowchart showing the processing operation of the viewpoint switching direction discrimination means or aim switching direction discrimination means of the first scene creation means.

On the other hand, if in step S12 it is decided that the operation input is an aim switching instruction and one proceeds to step S15, then by means of aim switching direction discrimination means 316, the switching direction of aim 206 is set by the same processing as in step S13 (steps S22–S29 in FIG. 12).

Next, in step S16, by means of aim display switching means 320, aim 206 is switched to the direction set in step S15 (see FIGS. 9A and 9B).

Following step S14 or S16, one proceeds to step S17, and it is distinguished whether there is a program termination request (game over, power turned off, etc.) to this first scene creation means 300. If there is no program termination request, one returns to step S11 and repeats the processing of step S11 and thereafter. On the other hand, if it is distinguished that there is a program termination request, the processing by this first scene creation means 300 terminates.

In this way, in the first viewpoint switching processing function or first aim switching processing function carried out by entertainment system 10 of this embodiment, the viewpoint and/or aim on screen 200 is switched to the switching direction corresponding to the combination of L1, L2, R1, R2 buttons 53a, 53b, 54a, 54b pressed by the user. Also, these L1, L2, R1, R2 buttons 53a, 53b, 54a, 54b are arranged in a form set up in two rows and two columns on the front of operation device 16 so that they can be pressed by the fingers of the user's left and right hands. Thus the user can sensually ascertain the relationship between the operation of pressing L1, L2, R1, R2 buttons 53a, 53b, 54a, 54b and the direction to which the viewpoint and/or aim on screen 200 will be switched That is, to switch the viewpoint, for example, leftward using the plus-sign key, one operates leftward key 51c, but to switch the viewpoint diagonally upward to the left or diagonally downward to the left, one must simultaneously operate leftward key 51c and upward key 51a or downward key 51b. That is, it is necessary to operate a key that has no direct relationship with the leftward direction, which creates the problem of making it impossible, for a user who is operating operation device 16 for the first time or a user who is playing the video game for the first time, to sensually grasp the direction in which one is trying to switch the viewpoint.

By contrast, with this embodiment, if for example one wishes to switch the viewpoint leftward, it suffices to simultaneously operate L1 button 53a and L2 button 53b, which function as buttons for horizontal-direction instructions on the left side. Also, by operating only L1 button 53a or L2 button 53b, the viewpoint is switched diagonally upward to the left or diagonally downward to the left. And if for example one wishes to switch the viewpoint upward, it suffices to simultaneously operate L1 button 53a and R1 button 54a, which function as buttons for vertical-direction instructions on the upper side. In this case too, by operating only L1 button 53a or R1 button 54a, the viewpoint is switched diagonally upward to the left or diagonally upward to the right Thus in this embodiment, to switch the viewpoint leftward, it suffices to operate L1 button 53a and/or L2 button 53b, which are aligned on the left side, and to switch the viewpoint upward, it suffices to operate L1 button 53a and/or R1 button 54a, which are aligned on the upper side. This makes it possible to ascertain by the senses the direction in which one is trying to switch the viewpoint, makes it simple to switch the viewpoint even for one who is operating operation device 16 for the first time or a user who is playing a video game for the first time, and if applied to a video game, etc., makes it possible to enjoy game development that one does not grow tired of. Also, the user is able to enjoy, for example, a tank game or other shooting game, etc. with better operability than has been available heretofore.

Also, in this embodiment, up, down, left, right, direction components corresponding to the up, down, left, right arrangement position of each button are included in output information corresponding to L1 button 53a, L2 button 53b, R1 button 54a, and R2 button 54b arranged in positions on the left and right that can be pressed by the left and right hands of said user on said front part of operation device 16, so the switching directions of the viewpoint on screen 200 of monitor 19 and the positions of the buttons to operate correspond to each other, and the user can recognize intuitively which direction to switch the viewpoint to. Therefore even in a flight simulation or other video game in which it is difficult to recognize a sense of direction, one is able to simply recognize the switching direction of the viewpoint, and even if it is a flight simulation, which is generally considered difficult to operate, the user is able to enjoy it simply and easily, which will help popularize various video games.

Next, with reference to FIGS. 13A–18, the second viewpoint switching processing function and the second aim switching processing function will be described.

These second viewpoint switching processing function and second aim switching processing function relating to a specific example cause L1, L2, R1, R2 buttons 53a, 53b, 54a, 54b to function as direction indication buttons, and through switcher 126 in FIG. 3 they cause A/D converter 114 to function as a means to output a multi-value digital signal Vd that takes on, for example, values 0–255. That is, when L1, L2, R1, R2 button 53a, 53b, 54a, 54b is pressed, a digital signal Vd corresponding to its amount of pressure is output from A/D converter 114, and when it is not pressed, value "0" is output.

Figure 13A:
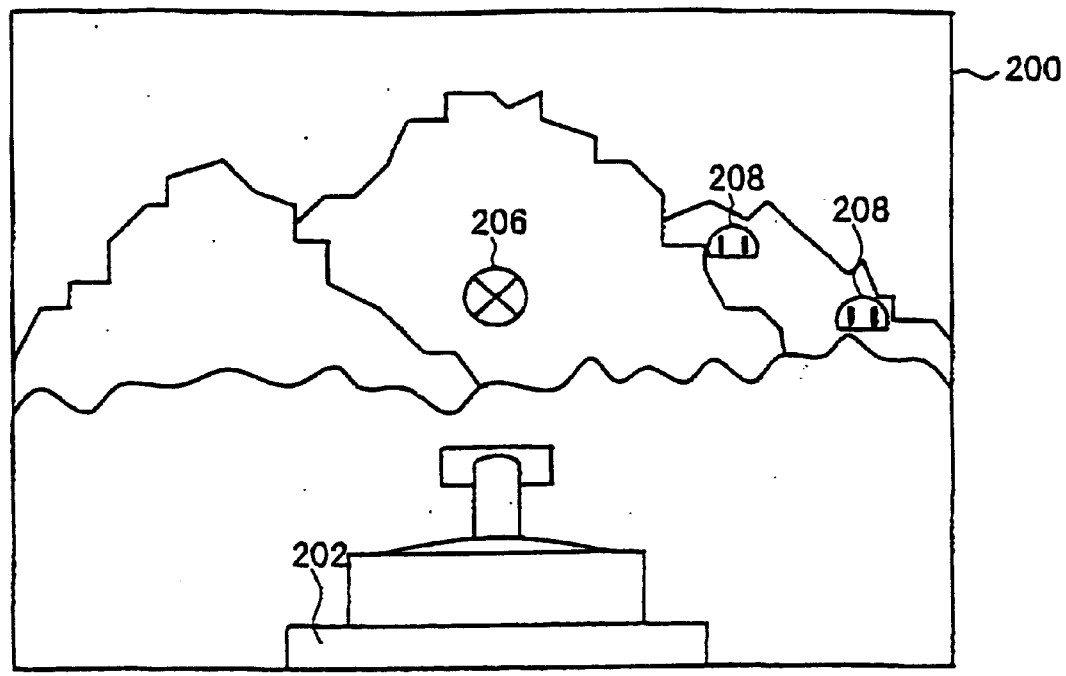
FIG. 13A is an explanatory diagram showing an image example displayed on the monitor screen before switching the viewpoint.
Figure 13B:
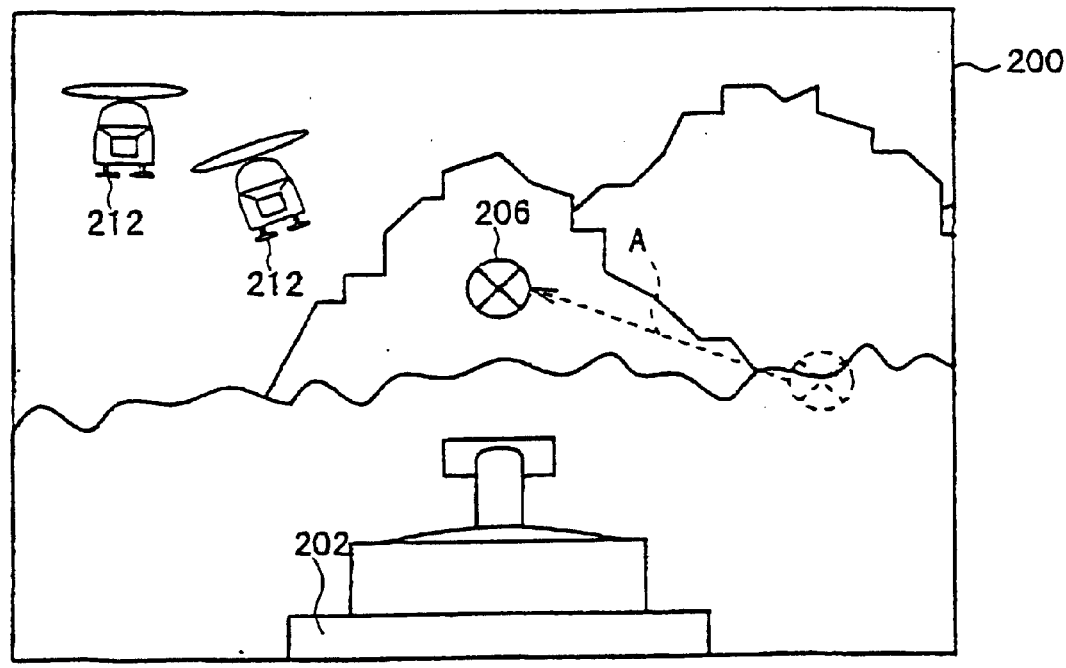
FIG. 13B is an explanatory diagram showing the image example after the viewpoint has been switched.

As shown in FIGS. 13A and 13B, the second viewpoint switching processing function switches the user's viewpoint on screen 200 of monitor 18 by moving the display position of the background objects and target objects displayed on screen 200 (virtual missile firing bases 208 and helicopters 212).

In this case, the switching direction of the viewpoint corresponding to the combination of L1, L2, R1, R2 buttons 53a, 53b, 54a, 54b is determined as in, for example, the example shown in FIG. 14 (the details are explained below). For example, from the state of FIG. 13A, by the user simultaneously pressing L1 button 53a and L2 button 53b, the background objects and target objects move in the direction of arrow A on screen 200, as shown in FIG. 13B. That is, the user's viewpoint switches from the position shown in FIG. 13A to the position shown in FIG. 13B.

Up, down, left, right direction components are assigned to L1, L2, R1, R2 buttons 53a, 53b, 54a, 54b in accordance with their up, down, left, right arrangement positions in operation device 16 (see FIG. 1). That is, direction components corresponding to L1, L2, R1, R2 buttons 53a, 53b, 54a, 54b are assigned respectively to the output information from operation device 16, that is to output values (digital signals) Vd from A/D converter 114 {for convenience, assumed to be P(L1), P(L2), P(R1), P(R2)}. Also, a 256-stage size component corresponding to the force with which the user presses each of L1, L2, R1, R2 buttons 53a, 53b, 54a, 54b is included in the output information from A/D converter 114 {output values P(L1), P(L2), P(R1), P(R2)}.

Viewpoint switching direction A is determined by vector computation based on the direction components and size components included in output values P(L1), P(L2), P(R1), P(R2). In this case, switching direction A is determined as angle θ (theta) with respect to the upward direction along the vertical line on screen 200 (the α (alpha) direction in FIG. 14). That is, L1, L2, R1, R2 buttons 53a, 53b, 54a, 54b function as buttons for indicating an arbitrary direction corresponding to how they are pressed (their combination, and the size of the pressing forces).

For example, if L1 button 53a and L2 button 53b are pressed, the angle (switching angle) θ(A) that determines switching direction A is determined by the following formula (1).

$$\theta(A)=\theta(L2)+90°\times P(L1)/\{P(L2)+P(L1)\} \quad (1)$$

Here, θ(L2) is the angle from direction a as far as direction L2 (for example, 225°). That is, said formula (1) is a computation formula that is constituted so as to inversely proportionately determine, based on the ratio of the sizes of output values P(L1) and P(L2), the ratio of the angle from the L1 direction as far as switching direction A, and the angle from the L2 direction as far as switching direction A, and to get the angle θ(A).

Similarly, switching angle θ(A) is determined by the respective following formulas (2)–(4) if L1 button 53a and R1 button 54a are pressed simultaneously, if R1 button 54a and R2 button 54b are pressed simultaneously, and if R2 button 54b and L2 button 53b are pressed simultaneously.

$$\theta(A)=\theta(L1)+90°\times P(R1)/\{P(L1)+P(R1)\} \quad (2)$$

$$\theta(A)=\theta(R1)+90°\times P(R2)/\{P(R1)+P(R2)\} \quad (3)$$

$$\theta(A)=\theta(R2)+90°\times P(L2)/\{P(R2)+P(L2)\} \quad (4)$$

Here, θ(L1), θ(R1), θ(R2) are the angle from direction α (the vertically upward direction) as far as direction L1, R1, R2 , respectively (for example, 315°, 45°, 135°, respectively). That is, said formulas (2), (3), and (4) are computation formulas that are constituted so as to determine switching angle θ(A) from the ratio of the sizes of output values P(L1) and P(R1), from the ratio of the sizes of output values P(R1) and P(R2), and from the ratio of the sizes of output values P(R2) and P(L2), respectively.

If any one of L1, L2, R1, R2 buttons 53a, 53b, 54a, 54b is pressed individually, switching direction A is set to the same prescribed direction as in FIG. 8. And it may be set up so that no viewpoint switching is done if a combination is selected other than the aforesaid combinations, namely, (L1 button 53a and L2 button 53b), (L1 button 53a and R1 button 54a), (R1 button 54a and R2 button 54b), and (R2 button 54b and L2 button 53b).

Also, it may be set up so that if L1, L2, R1, R2 buttons 53a, 53b, 54a, 54b are selectively pressed simultaneously with a prescribed button (for example, □ button 52d), then switching direction A is set to the same prescribed direction as in FIG. 8, regardless of the size of the forces with which these buttons 53a, 53b, 54a, 54b are pressed.

Also, the amplitude with which the viewpoint is to be switched (this is the switching amplitude at a prescribed time, also referred to as the switching speed) may be set so as to be constant at all times, or it may be set so as to be determined based on the size components of output values P(L1), P(L2), P(R1), P(R2). For example, the switching speed may be set to a prescribed high-speed value if the size components of output values P(L1), P(L2), P(R1), P(R2) are each greater than its prescribed threshold value, and the switching speed may be set to a prescribed low-speed value if they are less than the threshold values. Moreover, it may be set up so that the switching speed of the viewpoint is made to vary in multiple stages.

Figure 15A:
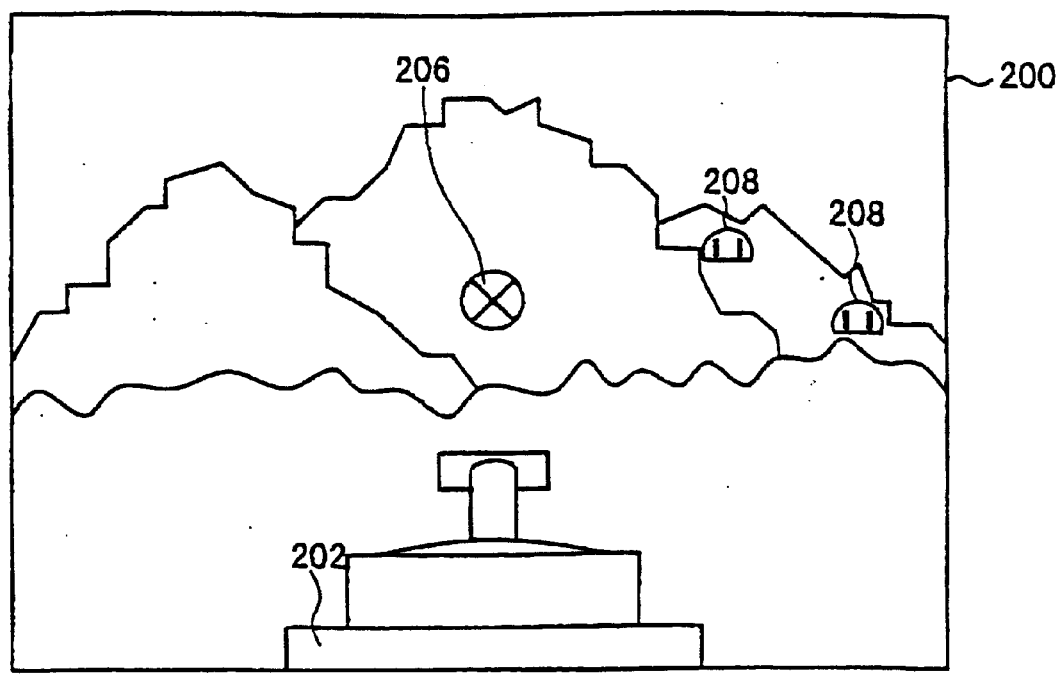
FIG. 15A is an explanatory diagram showing an image example displayed on the monitor screen before switching the aim.
Figure 15B:
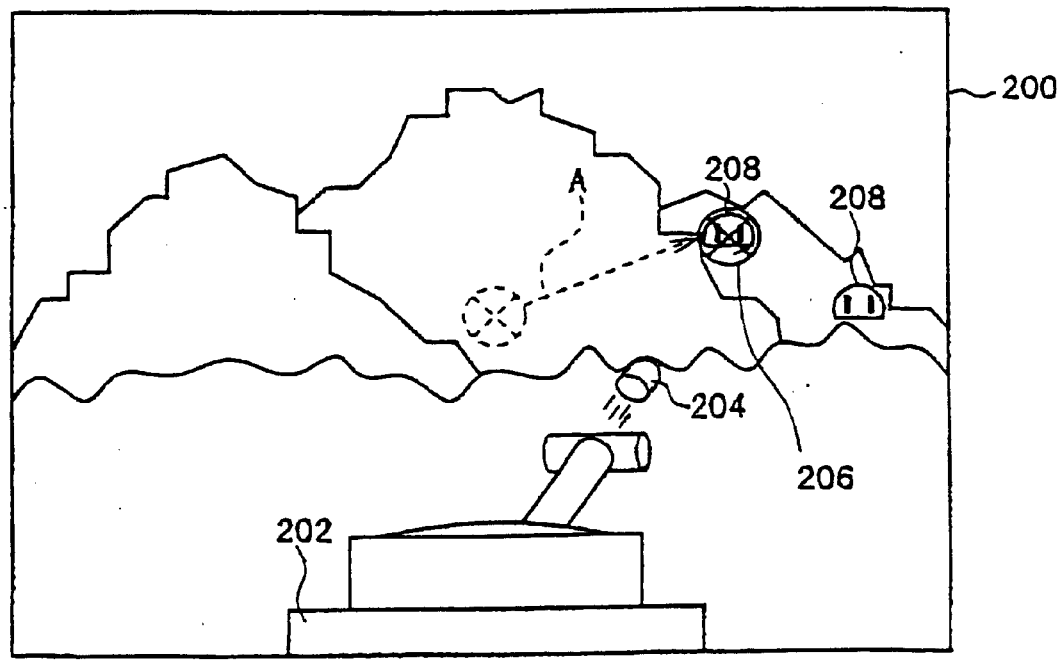
FIG. 15B is an explanatory diagram showing the image example after the aim has been switched.

Next, the second aim switching processing function switches aim 206 by moving the position of aim 206 for firing a virtual shell 204, etc. from virtual tank 202 displayed on screen 200, as shown in FIGS. 15A and 15B.

The position of aim 206 is switched from the state of FIG. 15A to, for example, the upper right on screen 200, as shown in FIG. 1 SB, by, for example, the user pressing R1 button 54a and R2 button 54b. And by firing shell 204 from tank 202 when aim 206 is aligned on a virtual missile firing base 208 as a target, shell 204 will make a direct hit on missile firing base 208, and said missile firing base 208 can be destroyed.

Figure 14:
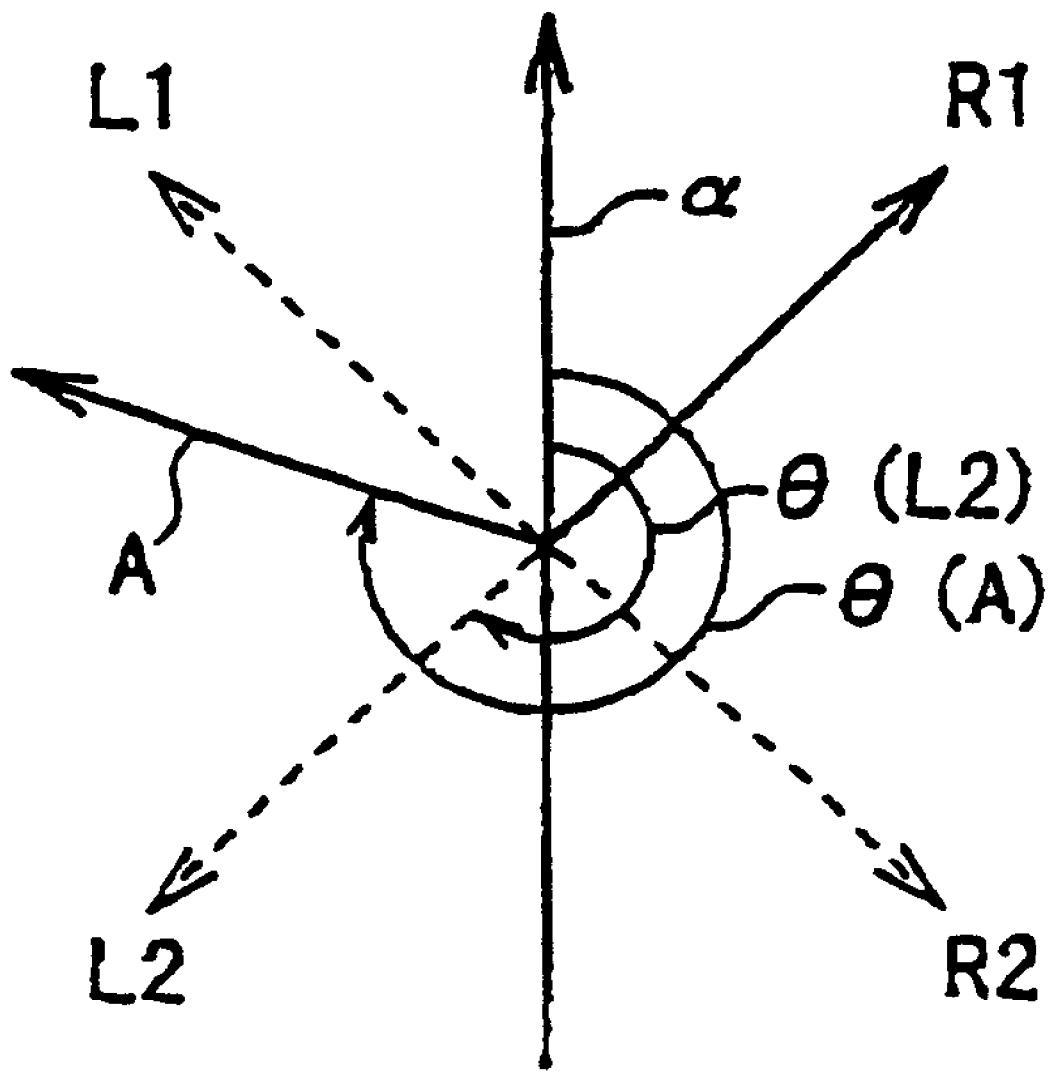
FIG. 14 is an explanatory diagram showing the relationship between the combination of operation inputs with respect to the L1 button and L2 button and the R1 button and R2 button, and the switching direction of the viewpoint or aim.

In this case, switching direction A of aim 206 corresponding to a combination of L1, L2, R1, R2 buttons 53a, 53b, 54a, 54b is the same as, for example, in the case of the second viewpoint switching processing function shown in FIG. 14.

Next, with reference to FIG. 16, the software for realizing said second viewpoint switching processing function and second aim switching processing function (second scene creation means 500) will be described.

This second scene creation means 500, like aforesaid first scene creation means 300 (see FIG. 10), is made in such a way as to be supplied to entertainment system 10 by, for example, a random-access recording medium such as a CD-ROM or memory card 14, as well as by a network. In this case too, we proceed with the description assuming a case in which it is run after having been read into entertainment device 12 from optical disk 20, such as a CD-ROM.

The second scene creation means 500 is run on CPU 401 by, for example, downloading it into RAM 402 of entertainment device 12, after going through prescribed processing, from a specified optical disk 20 previously played on entertainment device 12 (see FIG. 4).

Figure 16:
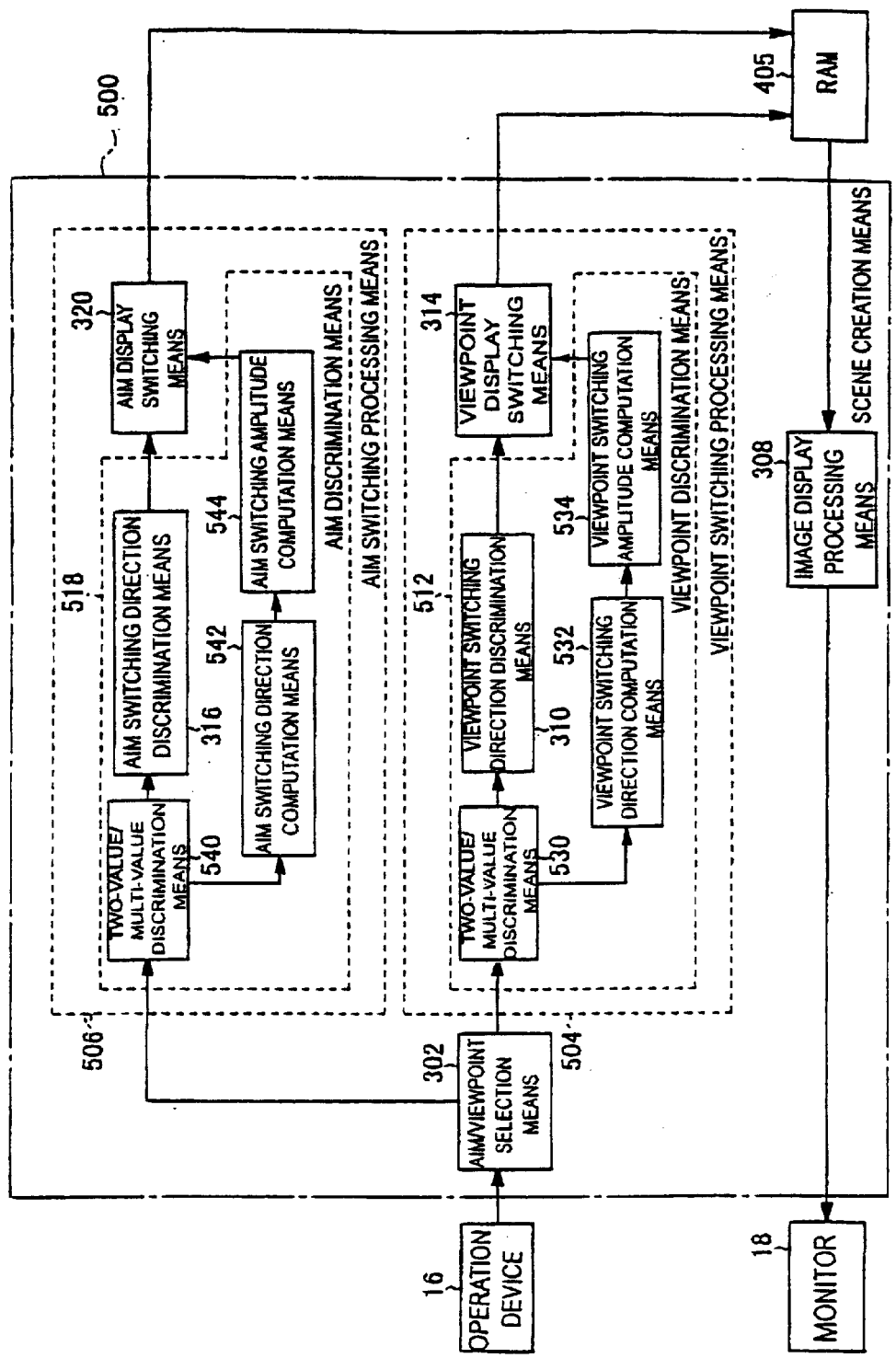
FIG. 16 is a functional block diagram showing the composition of a second scene creation means.

As shown in FIG. 16, this second scene creation means 500 has viewpoint switching processing means 504 and aim switching processing means 506. The composition of aim/viewpoint selection means 302 and image display processing means 308 is roughly the same as with scene creation means 300 in FIG. 10.

Viewpoint switching processing means 504 has a viewpoint discrimination means 512, which distinguishes the direction to switch the viewpoint to, and viewpoint display switching means 314, which performs viewpoint switching processing in accordance with the switching direction distinguished by viewpoint discrimination means 512. The composition of viewpoint display switching means 314 is roughly the same as with first scene creation means 300 shown in FIG. 10.

Viewpoint discrimination means 512 has two-value/multi-value discrimination means 530, which decides whether to process the output from A/D converter 114 in FIG. 3 as two-value output or whether to process it as multi-value output.

Viewpoint discrimination means 512 has viewpoint switching direction discrimination means 310, which sets the switching direction of the viewpoint to the direction shown in FIG. 8 (up, down, left, right, and prescribed directions between these) if the discrimination result by two-value/multi-value discrimination means 530 is two-value processing; viewpoint switching direction computation means 532, which sets the switching direction of the viewpoint to the direction shown in FIG. 14 (switching direction A) if the discrimination result by two-value/multi-value discrimination means 530 is multi-value processing; and viewpoint switching amplitude computation means (movement speed computation means) 534, which sets the switching amplitude (movement speed) of the viewpoint. The composition of viewpoint switching direction discrimination means 310 is roughly the same as with first scene creation means 300 shown in FIG. 10.

Aim switching processing means 506 has an aim discrimination means 518, which distinguishes the direction to switch the aim to, and aim display switching means 320, which performs aim switching processing in accordance with the switching direction distinguished by aim discrimination means 518. The composition of aim display switching means 320 is roughly the same as that of first scene creation means 300 shown in FIG. 10.

Aim discrimination means 518 has two-value/multi-value discrimination means 540, which decides whether to process the output from A/D converter 114 in FIG. 3 as two-value output or whether to process it as multi-value output.

Aim discrimination means 518 has aim switching direction discrimination means 316, which sets the switching direction of the aim to the direction shown in FIG. 8 if the discrimination result by a two-value/multi-value discrimination means 540 is two-value processing; aim switching direction computation means 542, which sets the switching direction of the aim to the direction shown in FIG. 14 if the discrimination result by two-value/multi-value discrimination means 540 is multi-value processing; and aim switching amplitude computation means 544, which sets the switching amplitude of the aim. The composition of aim switching direction discrimination means 316 is roughly the same as with first scene creation means 300 shown in FIG. 10.

Next, with reference to the flowcharts in FIGS. 17 and 18, the processing operation of second scene creation means 500 will be described.

Figure 17:
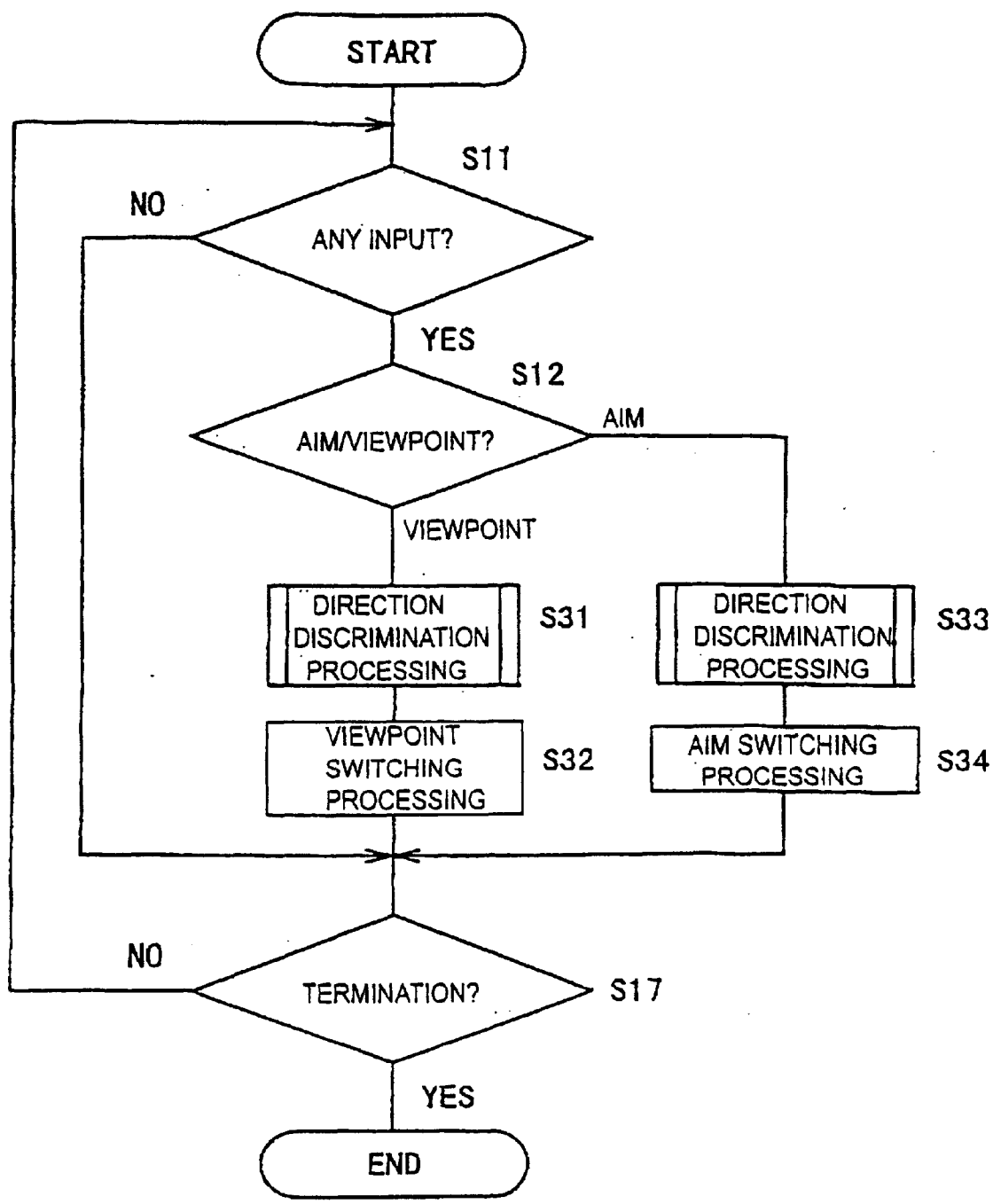
FIG. 17 is a flowchart showing the processing operation of the second scene creation means.

As shown in FIG. 17, this second scene creation means 500 first performs roughly the same processing as in steps S11 and S12 in FIG. 11. That is, in step S11 in FIG. 17, it decides whether there is any operation input from operation device 16. In the following step S12, it decides whether the operation input from operation device 16 is a viewpoint switching instruction or an aim switching instruction.

In step S12, if it is decided that the operation input is a viewpoint switching instruction, one proceeds to step S31, and if it is decided that the operation input is an aim switching instruction, one proceeds to step S33.

In step S31, the viewpoint switching direction indicated as operation input to operation device 16 is distinguished by means of viewpoint discrimination means 512.

Figure 18:
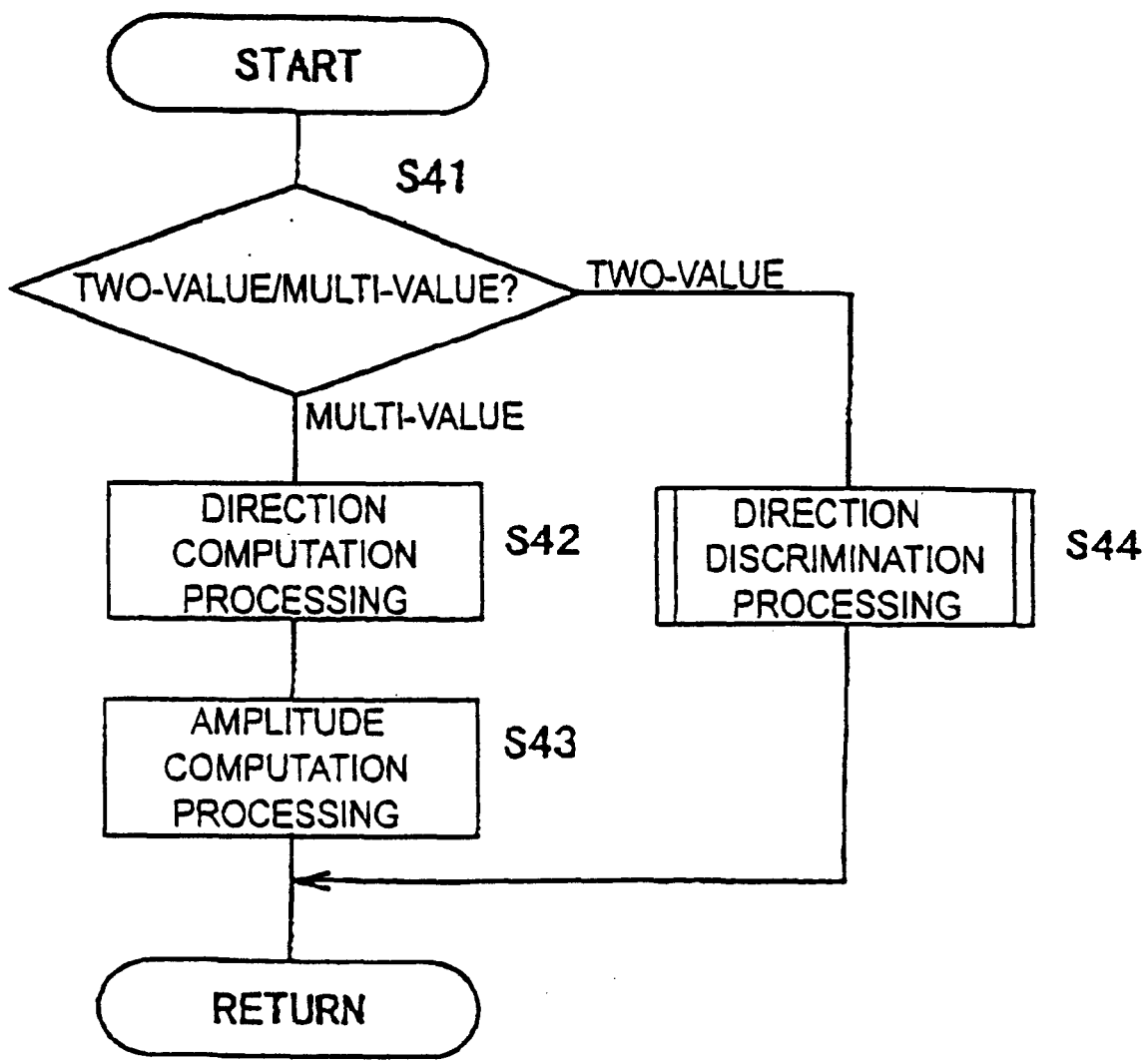
FIG. 18 is a flowchart showing the processing operation of the viewpoint switching amplitude computation means or aim switching amplitude computation means of the second scene creation means.

Specifically, in step S41 in FIG. 18, one distinguishes by means of two-value/multi-value discrimination means 530 whether the output from A/D converter 114 in FIG. 3 is to be given two-value processing or multi-value processing. In this discrimination, two-value processing is selected if, for example, □ button 52d has been pressed simultaneously when any of L1, L2, R1, R2 buttons 53a, 53b, 54a, 54b is pressed, and multi-value processing is selected if □ button 52d has not been pressed. In aforesaid step S41, one proceeds to step S42 if multi-value processing is selected, or to step S44 if two-value processing is selected.

In step S42, the switching direction of the viewpoint is set by means of viewpoint switching direction computation means 532. In this case, 256-stage output values P(L1), P(L2), P(R1), P(R2) are output from A/D converter 114 according to the force with which the user presses L1, L2, R1, R2 buttons 53a, 53b, 54a, 54b. Therefore, in viewpoint switching direction computation means 532, switching direction A is determined as shown in FIG. 14 by performing the calculation processing of aforesaid formulas (1)–(4) based on the direction components and size components included in aforesaid output values P(L1), P(L2), P(R1), P(R2).

Next, one proceeds to step S43, and by means of viewpoint switching amplitude computation means 534, the amplitude by which to switch the viewpoint (its movement speed) is set to, for example, a high-speed value or a low-speed value based on the size components of output values P(L1), P(L2), P(R1), P(R2). Specifically, the switching speed of the viewpoint is set to a high-speed value or a low-speed value based on whether the size components of output values P(L1), P(L2), P(R1), P(R2) are greater than prescribed threshold values (that is, whether L1, L2, R1, R2 buttons 53a, 53b, 54a, 54b have been pressed strongly). Also, it may be set up so as to vary the switching amplitude of the viewpoint based on whether a prescribed button (for example, Δ button 52a) is pressed simultaneously with L1, L2, R1, R2 buttons 53a, 53b, 54a, 54b.

If one proceeds from aforesaid step S41 to step S44, in this step S44, the switching direction of the viewpoint indicated by the operation input from operation device 16 is distinguished by means of viewpoint switching direction discrimination means 310. In this step S44, roughly the same processing is done as in step S13 in FIG. 11 (that is, steps S21–S29 in FIG. 12).

In this case, the amplitude by which to switch the viewpoint (its movement speed) may be set to a fixed value or, as with aforesaid step S43, it may be varied in two stages, to a high-speed value or a low-speed value, based on the size components of output values P(L1), P(L2), P(R1), P(R2).

Then, proceeding to step S32 in FIG. 17, the viewpoint is switched by the switching direction A and amplitude set in aforesaid step S31 (steps S42–S44 in FIG. 18) by means of viewpoint display switching means 314 (see FIGS. 13A and 13B).

If in step S12 in FIG. 17 it is decided that the operation input is an aim switching instruction and one proceeds to step S33, switching direction A of the aim indicated as operation input to operation device 16 is distinguished by aim discrimination means 518. In this step S33, roughly the same processing is carried out as in said step S31. That is, first, in step S41 in FIG. 18, it is distinguished by two-value/multi-value discrimination means 540 whether the output from A/D converter 114 shall be given two-value processing or multi-value processing. If multi-valued processing is selected in this step S41, one proceeds to step S42, but if two-value processing is selected, one proceeds to step S44.

In step S42, switching direction A of the aim is set by means of aim switching direction computation means 542. Then one proceeds to step S43, and the switching amplitude of the aim is set by means of aim switching amplitude computation means 544.

On the other hand, if one proceeds from aforesaid S41 to step S44, in this step S44 the switching direction of the aim indicated by the operation input from operation device 16 is distinguished by means of aim switching direction discrimination means 316.

Then, proceeding to step S34 in FIG. 17, aim 206 is switched by the switching direction A and amplitude set in aforesaid step S33 (steps S42–S44 in FIG. 18) by means of aim display switching means 320 (FIGS. 15A and 15B).

Following aforesaid step S32, S34, or S11 (if it is decided that there is no input from operation device 16), roughly the same processing is done as with step S17 in FIG. 11. That is, it is distinguished whether there is a program termination request (game over, power turned off, etc.) to this second scene creation means 500.

In the absence of any program termination request, one returns to aforesaid step S11 and repeats the processing of said steps S31, S12, S31–S34, and S17. In aforesaid step S17, if it is distinguished that there is a program termination request, processing by this second scene creation means 500 terminates.

In this way, in the second viewpoint switching processing function or second aim switching processing function run by entertainment system 10 of this embodiment, the viewpoint and/or aim on screen 200 is switched in an arbitrary direction according to the combination of user-pressed L1 button 53a and L2 button 53b as well as R1 button 54a and R2 button 54b, and according to the force with which the user presses said L1 button 53a and L2 button 53b as well as R1 button 54a and R2 button 54b. Thus, assuming for example the case in which the viewpoint is switched leftward, the angle of diagonally upward to the left or diagonally downward to the left can be freely set according to the size components. In other words, the switching direction of the viewpoint can be freely set, and smooth viewpoint switching can be realized.

Usually one thinks of switching the viewpoint at a constant speed, but if one wishes to switch the viewpoint quickly, as in a shooting game or adventure game, there is the fear that a dilemma will occur and the user will be given the impression that the operability is bad. But with this embodiment, because it is possible to quickly switch the viewpoint by changing the movement speed of said viewpoint or aim based on said size components, even in a shooting game or adventure game as referred to above, the user can be given an awareness that it is easy to operate, which can contribute to the popularization of a video game, etc. Also, the user can have a simulated experience of a battle with good operability and realistic operations, making it possible to enjoy, for example, a tank game or other shooting game, etc. such as has not previously been available.

Also, the program execution system, program execution device, recording medium, and program of this invention are of course not limited to the above embodiment, and can assume various compositions without departing from the gist of this invention.

For example, in the above-described embodiment, the switching direction of the viewpoint or aim corresponding to L1, L2, R1, R2 buttons 53a, 53b, 54a, 54b is Set by taking screen 200 of monitor 18 as the standard, but this switching direction may be set arbitrarily. For example, in cases such as a flight simulation, in which a user-manipulated object (such as a virtual fighter plane) is rotated with respect to a direction (or coordinate axis) in which screen 200 is taken as the standard, one may for example set the switching direction of the viewpoint or aim based on the direction as seen from this fighter plane. That is, the standard direction for determining the switching direction of the viewpoint or aim is, for example, fixed to an object such as a fighter plane, and if the object rotates, the standard direction is moved to match the motion of this object. In this case, even if operation device 16 is tilted to match the motion of the object, one can maintain the correspondence between the arrangement positions of L1, L2, R1, R2 buttons 53a, 53b, 54a, 54b and the switching direction of the viewpoint and the aim.

As described above, with the entertainment system and recording medium of this invention, it is possible, when operating, to sensually grasp the direction in which one tries to switch the viewpoint and/or aim, and it is possible to improve operability in, for example, a shooting game.

What is claimed is:

1. A program execution system comprising:
   a program execution device that executes programs;
   at least one operation device that inputs operation instructions in accordance with user's operation to said program execution device, said operation device having first and second leftward instruction buttons and first and second rightward instruction buttons;
   a display device that displays images output from said program execution device;
   a discrimination means that distinguishes a switching direction of a viewpoint in said display device based on a combination of output information output from said operation device in accordance with operation instructions from the user to said first and second leftward instruction buttons and first and second rightward instruction buttons; and a display switching means that switches said viewpoint to said switching direction distinguished by said discrimination means.

2. The program execution system according to claim 1, wherein
said output information is data that includes an ON/OFF component of said buttons and direction components that correspond to said buttons, and
said discrimination means has a switching direction discrimination means that distinguishes said switching direction according to a combination of said components.

3. The program execution system according to claim 1, wherein
said output information is data that includes size components that correspond to a force with which said user presses said buttons, and direction components that correspond to said buttons, and
said discrimination means has a switching direction computation means that computes said switching direction by vector computation based on said direction components and said size components.

4. The program execution system according to claim 3, wherein
said discrimination means has a movement speed computation means that determines the movement speed of said viewpoint based on said size components.

5. The program execution system according to claim 1, wherein
said buttons are provided on a front part of said operation device.

6. The program execution system according to claim 1, wherein
said buttons are provided on a front part of said operation device and are arranged in positions on the left and right that can be pressed by the fingers of the left and right hands of said user,
left and right direction components corresponding to the left and right arrangement positions of said buttons are allocated to said output information corresponding to said buttons, and
said discrimination means determines said switching direction based on said left and right direction components.

7. The program execution system according to claim 1, wherein
said buttons are arranged on a front part of said operation device, aligned two each on the top and bottom thereof, in positions on the left and right that can be pressed by the fingers of the left and right hands of said user,
up, down, left, right direction components corresponding to the up, down, left, right arrangement positions of said buttons are allocated to said output information corresponding to said buttons, and
said discrimination means determines said switching direction based on said up, down, left, right direction components.

8. A program execution system comprising:
a program execution device that executes programs;
at least one operation device that inputs operation instructions in accordance with user's operation to said program execution device, said operation device having first and second leftward instruction buttons and first and second rightward instruction buttons;
a display device that displays images output from said program execution device;

a discrimination means that distinguishes a switching direction of a virtual aim in said display device based on a combination of output information output from said operation device in accordance with operation instructions from the user to said first and second leftward instruction buttons and first and second rightward instruction buttons; and
a display switching means that switches said virtual aim to said switching direction distinguished by said discrimination means.

9. The program execution system according to claim 8, wherein
said output information is data that includes an ON/OFF component of said buttons and direction components that correspond to said buttons, and
said discrimination means has a switching direction discrimination means that distinguishes said switching direction according to a combination of said components.

10. The program execution system according to claim 8, wherein
said output information is data that includes size components that correspond to the force with which said user presses said buttons, and direction components that correspond to said buttons, and
said discrimination means has a switching direction computation means that computes said switching direction by vector computation based on said direction components and said size components.

11. The program execution system according to claim 10, wherein
said discrimination means has a movement speed computation means that determines the movement speed of said virtual aim based on said size components.

12. The program execution system according to claim 8, wherein
said buttons are provided on a front part of said operation device.

13. The program execution system according to claim 8, wherein
said buttons are provided on a front part of said operation device and are arranged in positions on the left and right that can be pressed by the fingers of the left and right hands of said user,
left and right direction components corresponding to the left and right arrangement positions of said buttons are allocated to said output information corresponding to said buttons, and
said discrimination means determines said switching direction based on said left and right direction components.

14. The program execution system according to claim 8, wherein
said buttons are arranged on a front part of said operation device, aligned two each on the top and bottom thereof, in positions on the left and right that can be pressed by the fingers of the left and right hands of said user,
up, down, left, right direction components corresponding to the up, down, left, right arrangement positions of said buttons are allocated to said output information corresponding to said buttons, and
said discrimination means determines said switching direction based on said up, down, left, right direction components.

15. A program execution device to which can be connected at least an operation device that outputs operation instructions in accordance with user's operation and a display device for displaying images, the program execution device comprising:
- a discrimination means that distinguishes a switching direction of a viewpoint in said display device based on a combination of output information output from said operation device in accordance with operation instructions from the user to first and second leftward instruction buttons and first and second rightward instruction buttons provided on said operation device; and
- a display switching means that switches said viewpoint to said switching direction distinguished by said discrimination means.

16. A program execution device to which can be connected at least an operation device that outputs operation instructions in accordance with user's operation and a display device for displaying images, the program execution device comprising:
- a discrimination means that distinguishes a switching direction of a virtual aim in said display device based on a combination of output information output from said operation device in accordance with operation instructions from the user to first and second leftward instruction buttons and first and second rightward instruction buttons provided on said operation device; and
- a display switching means that switches said virtual aim to said switching direction distinguished by said discrimination means.

17. A recording medium on which are recorded a program and data used in a program execution system including a program execution device that executes programs, at least one operation device that inputs operation instructions in accordance with user's operation to said program execution device, and a display device that displays images output from said program execution device, the program comprising:
- a discrimination step that distinguishes a switching direction of a viewpoint in said display device based on a combination of output information output from said operation device in accordance with operation instructions from the user to first and second leftward instruction buttons and first and second rightward instruction buttons provided on said operation device; and
- a display switching step that switches said viewpoint to said switching direction distinguished by said discrimination step.

18. The recording medium according to claim 17, wherein said output information is data that includes an ON/OFF component of said buttons and direction components that correspond to said buttons, and
said discrimination step has a switching direction discrimination step that distinguishes said switching direction according to a combination of said components.

19. The recording medium according to claim 17, wherein said output information is data that includes size components that correspond to a force with which said user presses said buttons, and direction components that correspond to said buttons, and
said discrimination step has a switching direction computation step that computes said switching direction by vector computation based on said direction components and said size components.

20. The recording medium according to claim 19, wherein said discrimination step has a movement speed computation step that determines the movement speed of said viewpoint based on said size components.

21. The recording medium according to claim 17, wherein buttons provided on a front part of said operation device are made to function as said instruction buttons.

22. The recording medium according to claim 17, wherein said buttons are provided on a front part of said operation device and are arranged in positions on the left and right that can be pressed by the fingers of the left and right hands of said user, and left and right direction components corresponding to the left and right arrangement positions of said buttons are allocated to said output information corresponding to said buttons, and wherein
in said discrimination step, said switching direction is determined based on said left and right direction components.

23. The recording medium according to claim 17, wherein said buttons are arranged on a front part of said operation device, aligned two each on the top and bottom thereof, in positions on the left and right that can be pressed by the fingers of the left and right hands of said user, and up, down, left, right direction components corresponding to the up, down, left, right arrangement positions of said buttons are allocated to said output information corresponding to said buttons, and wherein
in said discrimination step, said switching direction is determined based on said up, down, left, right direction components.

24. A recording medium on which are recorded a program and data used in a program execution system including a program execution device that executes programs, at least one operation device that inputs operation instructions in accordance with user's operation to said program execution device, and a display device that displays images output from said program execution device, the program comprising:
- a discrimination step that distinguishes a switching direction of a virtual aim in said display device based on a combination of output information output from said operation device in accordance with operation instructions from the user to first and second leftward instruction buttons and first and second rightward instruction buttons provided on said operation device; and
- a display switching step that switches said virtual aim to said switching direction distinguished by said discrimination step.

25. The recording medium according to claim 24, wherein said output information is data that includes an ON/OFF component of said buttons and direction components that correspond to said buttons, and
said discrimination step has a switching direction discrimination step that distinguishes said switching direction according to a combination of said components.

26. The recording medium according to claim 24, wherein said output information is data that includes size components that correspond to a force with which said user presses said buttons, and direction components that correspond to said buttons, and
said discrimination step has a switching direction computation step that computes said switching direction by vector computation based on said direction components and said size components.

27. The recording medium according to claim 26, wherein said discrimination step has a movement speed computation step that determines the movement speed of said aim based on said size components.

28. The recording medium according to claim 24, wherein buttons provided on a front part of said operation device are made to function as said instruction buttons.

29. The recording medium according to claim 24, wherein said buttons are provided on a front part of said operation device and are arranged in positions on the left and right that can be pressed by the fingers of the left and right hands of said user, and left and right direction components corresponding to the left and right arrangement positions of said buttons are allocated to said output information corresponding to said buttons, and wherein in said discrimination step, said switching direction is determined based on said left and right direction components.

30. The recording medium according to claim 24, wherein said buttons are arranged on a front part of said operation device, aligned two each on the top and bottom thereof, in positions on the left and right that can be pressed by the fingers of the left and right hands of said user, and up, down, left, right direction components corresponding to the up, down, left, right arrangement positions of said buttons are allocated to said output information corresponding to said buttons, and wherein in said discrimination step, said switching direction is determined based on said up, down, left, right direction components.

31. A program used in a program execution system including a program execution device that executes programs, at least one operation device that inputs operation instructions in accordance with user's operation to said program execution device, and a display device that displays images output from said program execution device, the program comprising:

a discrimination step that distinguishes a switching direction of a viewpoint in said display device based on a combination of output information output from said operation device in accordance with operation instructions from the user to first and second leftward instruction buttons and first and second rightward instruction buttons provided on said operation device; and a display switching step that switches said viewpoint to said switching direction distinguished by said discrimination step.

32. A program used in a program execution system including a program execution device that executes programs, at least one operation device that inputs operation instructions in accordance with user's operation to said program execution device, and a display device that displays images output from said program execution device, the program comprising:

a discrimination step that distinguishes a switching direction of a virtual aim in said display device based on a combination of output information output from said operation device in accordance with operation instructions from the user to first and second leftward instruction buttons and first and second rightward instruction buttons provided on said operation device; and a display switching step that switches said aim to said switching direction distinguished by said discrimination step.

33. A method for switching a viewpoint on a display device in accordance with user operation instructions input to an operation device, the method comprising:

a step that takes in output information that includes direction components that correspond to arrangement positions of first and second leftward instruction buttons and first and second rightward instruction buttons provided on said operation device, and is output from said operation device in accordance with operation instructions from the user to said first and second leftward instruction buttons and first and second rightward instruction buttons;

a discrimination step that distinguishes a switching direction of said viewpoint in said display device based on a combination of said direction components; and a display switching step that switches said viewpoint to said switching direction distinguished by said discrimination step.

34. A method for switching a virtual aim on a display device in accordance with user operation instructions input to an operation device, the method comprising:

a step that takes in output information that includes direction components that correspond to arrangement positions of first and second leftward instruction buttons and first and second rightward instruction buttons provided on said operation device, and is output from said operation device in accordance with operation instructions from the user to said first and second leftward instruction buttons and first and second rightward instruction buttons;

a discrimination step that distinguishes a switching direction of said aim in said display device based on a combination of said direction components; and a display switching step that switches said aim to said switching direction distinguished by said discrimination step.

35. The program execution system of claim 1, wherein the switching direction varies with a first pattern of instruction buttons selected and a second pattern of pressing forces applied to the elected instruction buttons.

36. The program execution system of claim 1, wherein the switching direction varies with a first pattern of instruction buttons selected and a second pattern of pressing forces applied to the elected instruction buttons.

37. The program execution device of claim 15, wherein the switching direction varies with a first pattern of instruction buttons selected and a second pattern of pressing forces applied to the elected instruction buttons.

38. The program execution device of claim 16, wherein the switching direction varies with a first pattern of instruction buttons selected and a second pattern of pressing forces applied to the elected instruction buttons.

39. The recording medium of claim 17, wherein the switching direction varies with a first pattern of instruction buttons selected and a second pattern of pressing forces applied to the elected instruction buttons.

40. The recording medium of claim 24, wherein the switching direction varies with a first pattern of instruction buttons selected and a second pattern of pressing forces applied to the elected instruction buttons.

41. The program of claim 31, wherein the switching direction varies with a first pattern of instruction buttons selected and a second pattern of pressing forces applied to the elected instruction buttons.

42. The program of claim 32, wherein the switching direction varies with a first pattern of instruction buttons selected and a second pattern of pressing forces applied to the elected instruction buttons.

* * * * *